US012689447B2

(12) United States Patent
Wey et al.

(10) Patent No.:     US 12,689,447 B2
(45) Date of Patent:        Jul. 21, 2026

(54) POWER SAVING MECHANISMS FOR HIGH SPEED PASSIVE OPTICAL NETWORK

(71) Applicant: ZTE Corporation, Shenzhen (CN)

(72) Inventors: Jun Shan Wey, Shenzhen (CN); Dan Geng, Shenzhen (CN); Liquan Yuan, Shenzhen (CN); Weiliang Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 268 days.

(21) Appl. No.: 18/488,434

(22) Filed: Oct. 17, 2023

(65) Prior Publication Data

US 2024/0063919 A1     Feb. 22, 2024

Related U.S. Application Data

(63) Continuation of application No. 17/473,893, filed on Sep. 13, 2021, now Pat. No. 11,804,909, which is a continuation of application No. PCT/CN2019/078114, filed on Mar. 14, 2019.

(51) Int. Cl.
    *H04B 10/80*        (2013.01)
    *H04B 10/40*        (2013.01)
(52) U.S. Cl.
    CPC ............. *H04B 10/80* (2013.01); *H04B 10/40* (2013.01)
(58) Field of Classification Search
    CPC ............................... H04B 10/40; H04B 10/80
    USPC ......................................................... 398/135
    See application file for complete search history.

(56) References Cited

U.S. PATENT DOCUMENTS

| | | | | | |
|---|---|---|---|---|---|
| 7,493,053 | B2* | 2/2009 | Liu | ..................... | H04B 10/6932 |
| | | | | | 398/209 |
| 8,600,231 | B2* | 12/2013 | Skubic | ............... | H04Q 11/0067 |
| | | | | | 398/58 |
| 8,731,399 | B2* | 5/2014 | Zhang | ................ | H04Q 11/0067 |
| | | | | | 398/15 |
| 8,903,251 | B2* | 12/2014 | Cheng | .................. | H04B 10/671 |
| | | | | | 398/58 |
| 2006/0133809 | A1* | 6/2006 | Chow | ................... | H04J 3/1694 |
| | | | | | 398/66 |
| 2009/0245790 | A1* | 10/2009 | Mizutani | .............. | H04J 3/0682 |
| | | | | | 398/43 |

(Continued)

FOREIGN PATENT DOCUMENTS

| | | |
|---|---|---|
| CN | 101873518 C | 10/2010 |
| EP | 2469786 | 6/2012 |

(Continued)

OTHER PUBLICATIONS

Communication under Rule 71(3) EPC for European Application No. 19 919 019.0 dated Oct. 29, 2024, 7 pages.

(Continued)

*Primary Examiner* — Dalzid E Singh
(74) *Attorney, Agent, or Firm* — Perkins Coie LLP

(57)        ABSTRACT
A method of communication includes notify, by an optical line terminal (OLT), an optical network unit (ONU) a first time period assigned to a first power saving operation and a second time period assigned to a second power saving operation, and perform, by the OLT, the second power saving operation for a receiver of the OLT during the second time period and the first power saving operation for a transmitter of the OLT during the first time period.

18 Claims, 17 Drawing Sheets

(56)           References Cited

U.S. PATENT DOCUMENTS

| | | | |
|---|---|---|---|
| 2012/0008937 A1* | 1/2012 | Cheng ................ | H04Q 11/0067 398/1 |
| 2012/0288279 A1* | 11/2012 | Zhang ................ | H04Q 11/0067 398/182 |
| 2013/0004161 A1* | 1/2013 | Xia ....................... | H04B 10/272 398/25 |
| 2013/0034355 A1* | 2/2013 | Zhang ................ | H04Q 11/0067 398/67 |
| 2013/0148972 A1* | 6/2013 | Kazawa ............ | H04Q 11/0067 398/100 |
| 2014/0112662 A1* | 4/2014 | Skubic ................ | H04B 10/272 398/38 |
| 2014/0193150 A1 | 7/2014 | Mukai et al. | |
| 2014/0321854 A1 | 10/2014 | Ghazisaidi | |
| 2015/0104174 A1* | 4/2015 | Kim ................... | H04Q 11/0067 398/67 |
| 2015/0222440 A1* | 8/2015 | Khotimsky ........... | H04B 10/27 398/58 |
| 2016/0020913 A1* | 1/2016 | Kim ................... | H04Q 11/0067 398/135 |

FOREIGN PATENT DOCUMENTS

| | | |
|---|---|---|
| EP | 2552084 | 1/2013 |
| EP | 2566112 | 6/2013 |
| WO | 2013/014483 | 1/2013 |

OTHER PUBLICATIONS

Co-pending EP Application Extended Search Report, EP Appl. No. 19919019.0, dated Feb. 24, 2022, 7 pages.
Co-pending Chinese Application First Office Action, Chinese Appl. No. 201980093668.6, dated Jun. 29, 2022, 22 pages with unofficial translation.
Co-pending Chinese Application Second Office Action, Chinese Appl. No. 201980093668.6, dated Dec. 27, 2022, 19 pages with unofficial translation.
IP Office China PRC, International Search Report and Written Opinion for Application No. PCT/CN2019/078114, Dec. 5, 2019, 9 pages.
Co-pending EP Application Article 94 Communication, EP Appl. No. 19919019.0, dated Sep. 13, 2023, 5 pages.

* cited by examiner

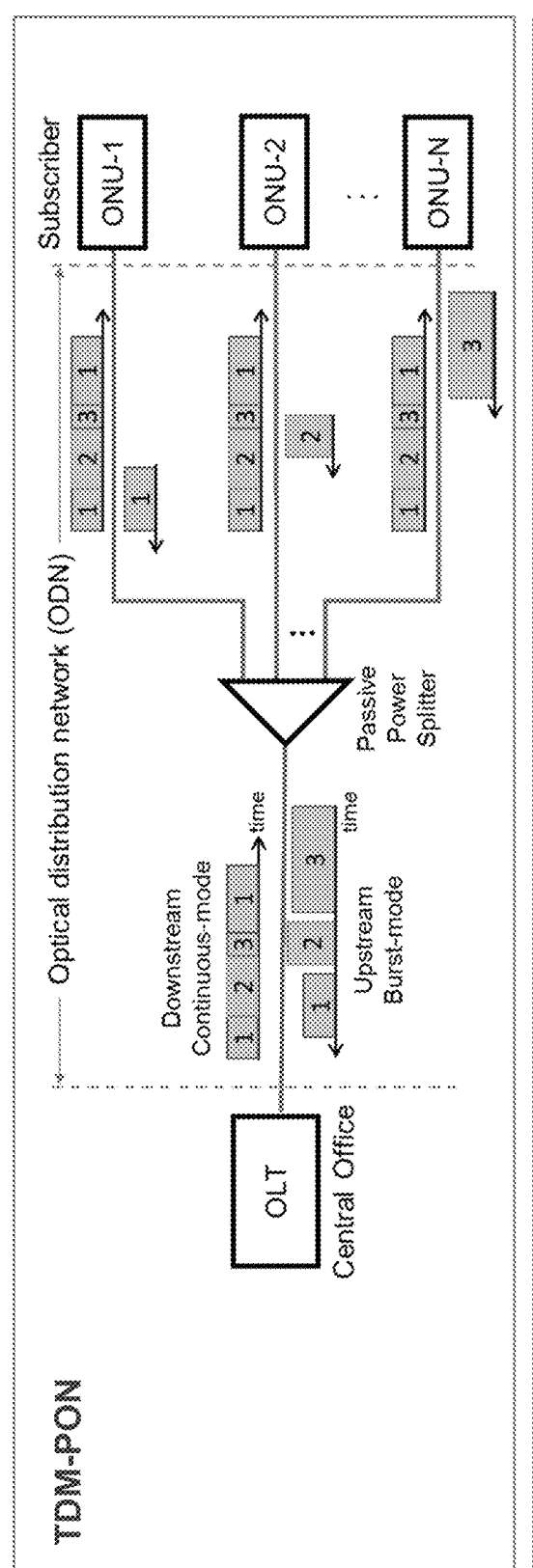
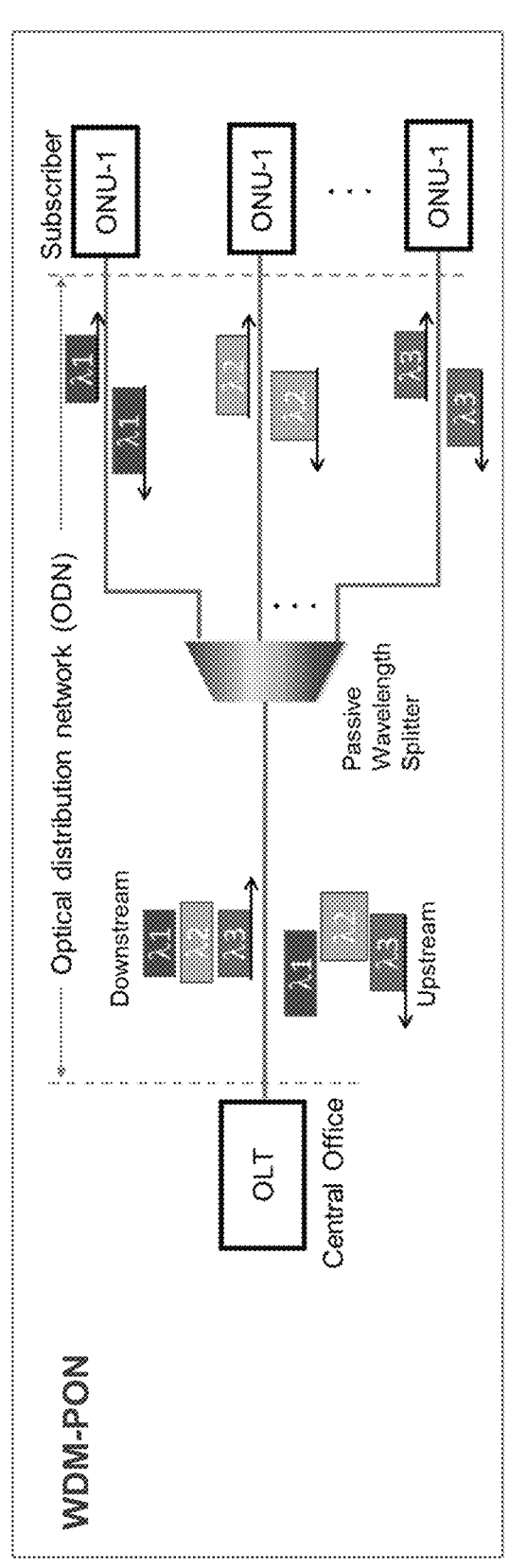
FIG. 6

900

902

Notify, by an optical line terminal (OLT), an optical network unit (ONU) a first time period assigned to a first power saving operation and a second time period assigned to a second power saving operation

904

Perform, by the OLT, the second power saving operation for a receiver of the OLT during the second time period and the first power saving operation for a transmitter of the OLT during the first time period

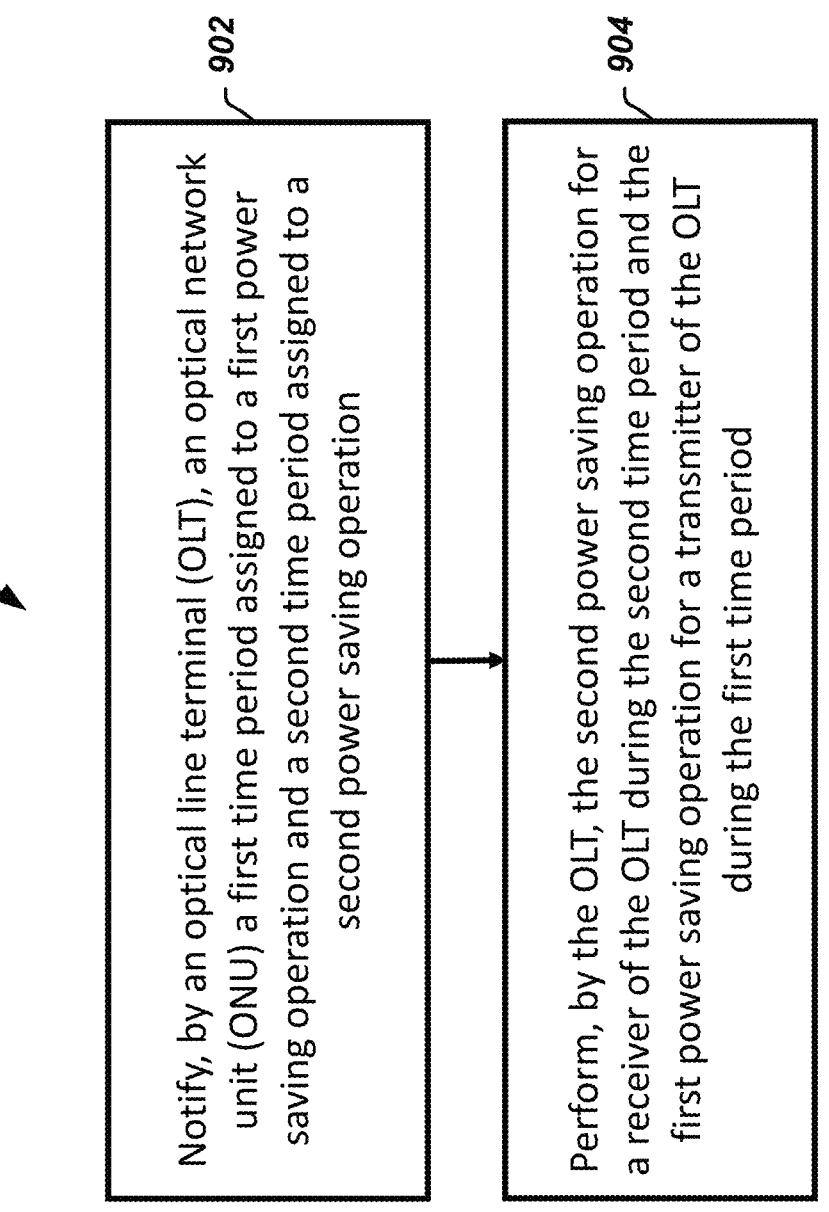

FIG. 9

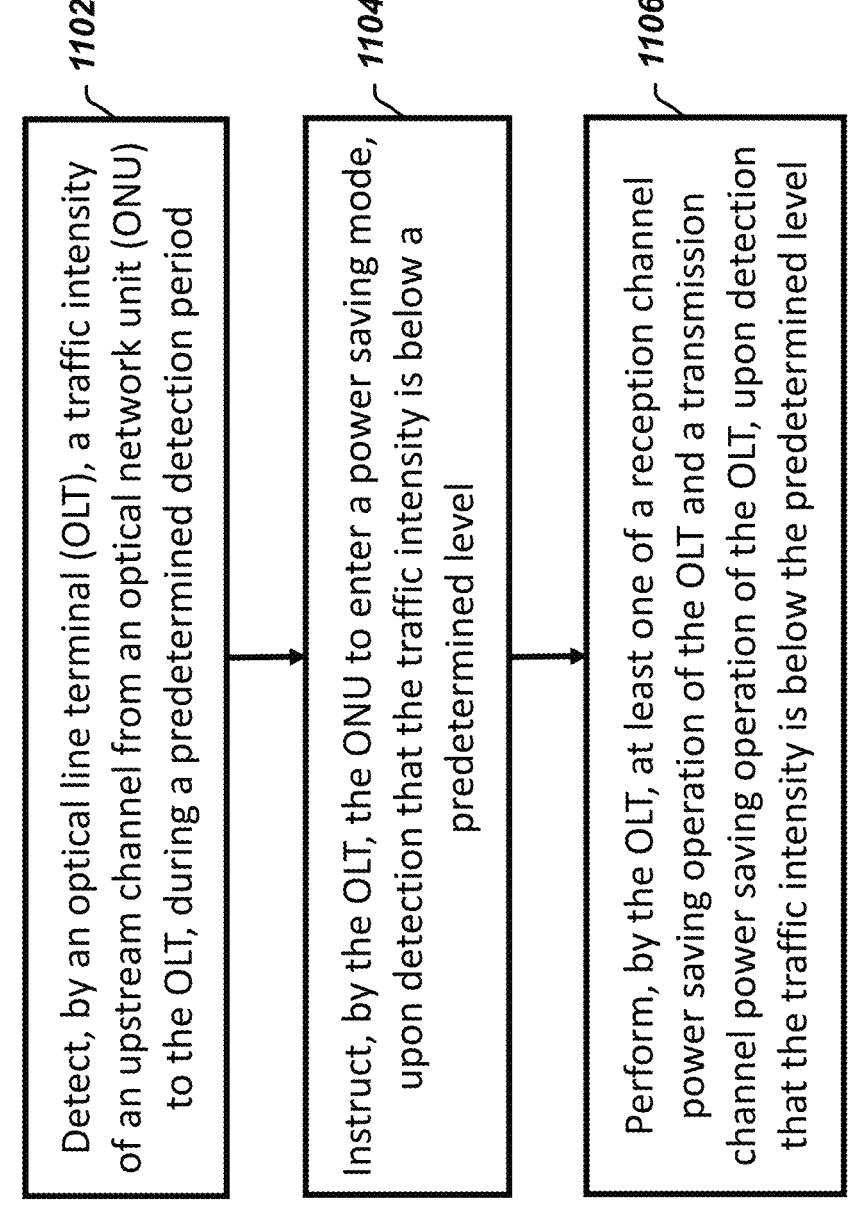

1100

1102

Detect, by an optical line terminal (OLT), a traffic intensity of an upstream channel from an optical network unit (ONU) to the OLT, during a predetermined detection period

1104

Instruct, by the OLT, the ONU to enter a power saving mode, upon detection that the traffic intensity is below a predetermined level

1106

Perform, by the OLT, at least one of a reception channel power saving operation of the OLT and a transmission channel power saving operation of the OLT, upon detection that the traffic intensity is below the predetermined level

FIG. 11

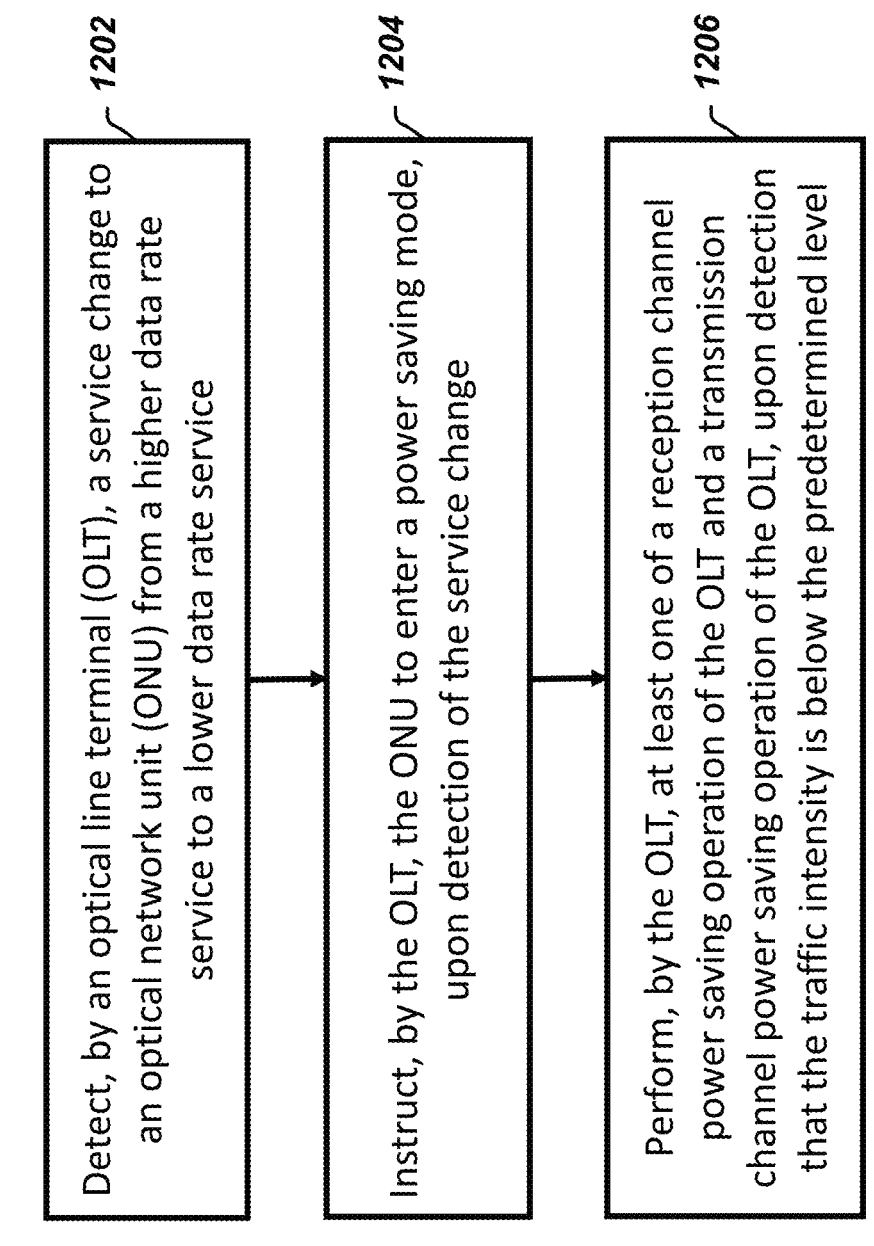

1200

1202

Detect, by an optical line terminal (OLT), a service change to an optical network unit (ONU) from a higher data rate service to a lower data rate service

1204

Instruct, by the OLT, the ONU to enter a power saving mode, upon detection of the service change

1206

Perform, by the OLT, at least one of a reception channel power saving operation of the OLT and a transmission channel power saving operation of the OLT, upon detection that the traffic intensity is below the predetermined level

FIG. 12

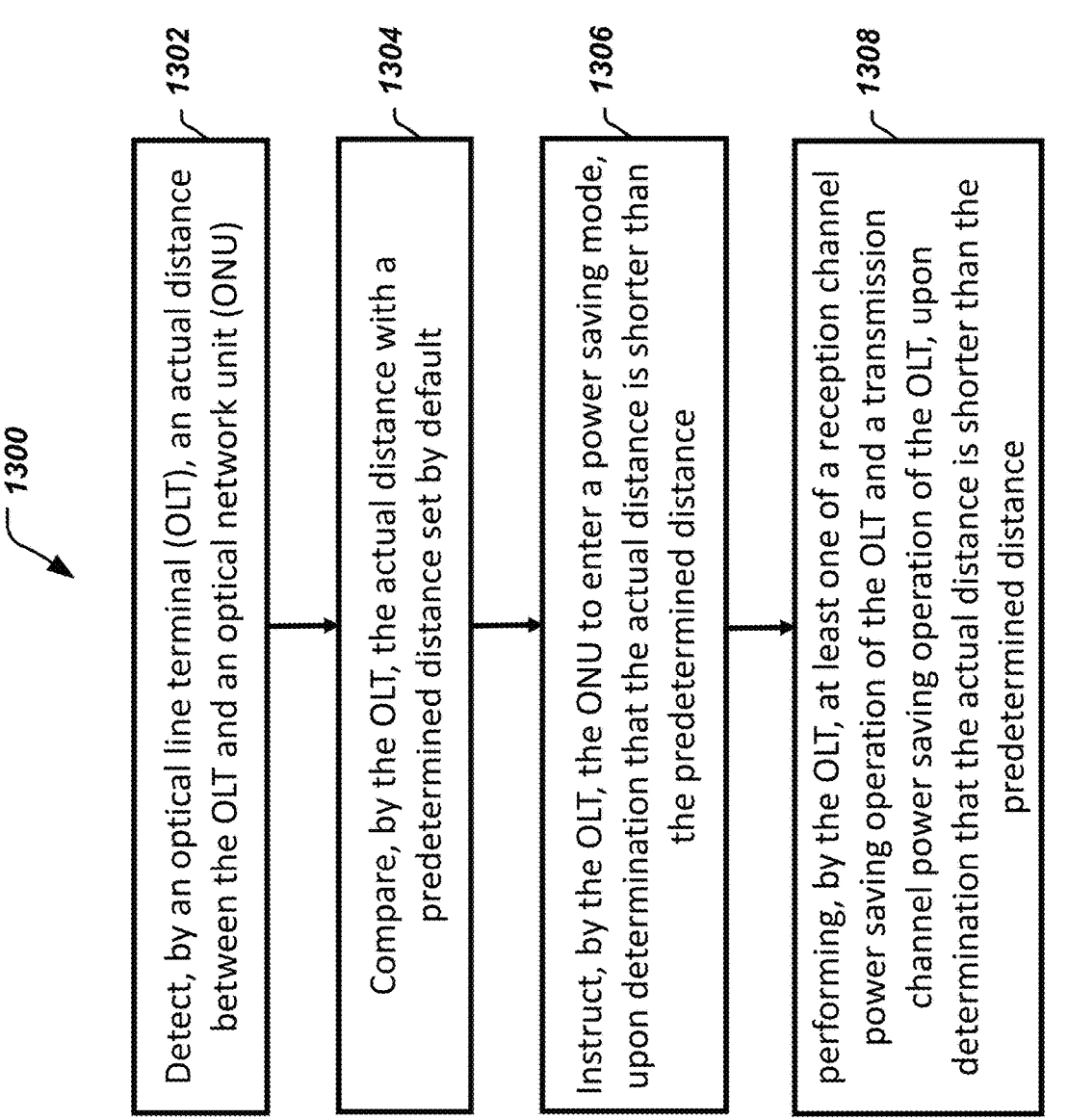

1300

1302
Detect, by an optical line terminal (OLT), an actual distance between the OLT and an optical network unit (ONU)

1304
Compare, by the OLT, the actual distance with a predetermined distance set by default 1306
Instruct, by the OLT, the ONU to enter a power saving mode, upon determination that the actual distance is shorter than the predetermined distance 1308
performing, by the OLT, at least one of a reception channel power saving operation of the OLT and a transmission channel power saving operation of the OLT, upon determination that the actual distance is shorter than the predetermined distance

FIG. 13

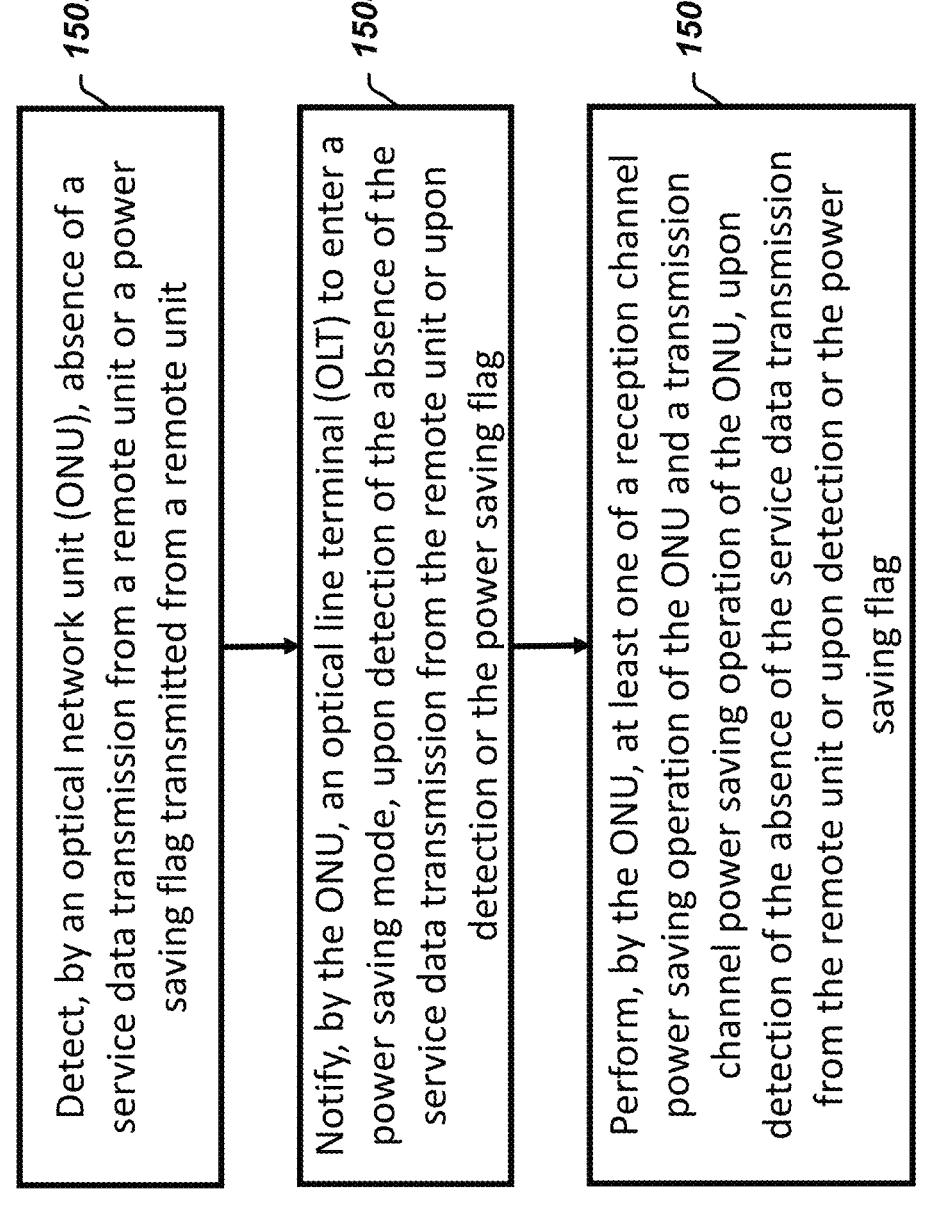

1500

1502

Detect, by an optical network unit (ONU), absence of a service data transmission from a remote unit or a power saving flag transmitted from a remote unit

1504

Notify, by the ONU, an optical line terminal (OLT) to enter a power saving mode, upon detection of the absence of the service data transmission from the remote unit or upon detection or the power saving flag

1506

Perform, by the ONU, at least one of a reception channel power saving operation of the ONU and a transmission channel power saving operation of the ONU, upon detection of the absence of the service data transmission from the remote unit or upon detection or the power saving flag

FIG. 15

POWER SAVING MECHANISMS FOR HIGH SPEED PASSIVE OPTICAL NETWORK

PRIORITY CLAIM

This application is a continuation of U.S. patent application Ser. No. 17/473,893, filed Sep. 13, 2021 which is a continuation of and claims priority to International Patent Application No. PCT/CN2019/078114, filed Mar. 14, 2019, which is incorporated herein by reference in its entirety.

TECHNICAL FIELD

The present document relates to optical communication systems.

BACKGROUND

Passive optical network (PON) is a promising candidate for next-generation optical access network. In the PON, an Optical Line Terminal (OLT) at the network operators' central office communicates with a large number of Optical Network Units (ONUs) at end users. In recent years, applications that require higher data rate, such as video streaming and cloud computing, have become the most popular applications on the network. Such applications, along with the increased mobile traffic that needs to be carried over mobile fronthaul, are driving bandwidth demand in access networks. With such an increase in bandwidth demand, the power saving mechanism has become a key research issue in the PON design.

SUMMARY

The present document discloses techniques for power efficiency and power saving mechanisms for next-generation optical access network.

In one example aspect, a method of communication includes notifying, by an optical line terminal (OLT), an optical network unit (ONU) a first time period assigned to a first power saving operation and a second time period assigned to a second power saving operation, and performing, by the OLT, the second power saving operation for a receiver of the OLT during the second time period and the first power saving operation for a transmitter of the OLT during the first time period.

In another example aspect, a method of communication includes receiving, by an optical network unit (ONU), a notification regarding a first time period assigned to a first power saving operation and a second time period assigned to a second power saving operation, and performing, by the ONU, the first power saving operation for a receiver of the ONU during the first time period and the second power saving operation for a transmitter of the ONU during the second time period.

In yet another example aspect, a method of communication includes detecting, by an optical line terminal (OLT), a traffic intensity of an upstream channel from an optical network unit (ONU) to the OLT, during a predetermined detection period, instructing, by the OLT, the ONU to enter a power saving mode, upon detection that the traffic intensity is below a predetermined level, and performing, by the OLT, at least one of a reception channel power saving operation of the OLT and a transmission channel power saving operation of the OLT, upon detection that the traffic intensity is below the predetermined level.

In yet another example aspect, a method of communication includes detecting, by an optical line terminal (OLT), a service change to an optical network unit (ONU) from a higher data rate service to a lower data rate service, instructing, by the OLT, the ONU to enter a power saving mode, upon detection of the service change, and performing, by the OLT, at least one of a reception channel power saving operation of the OLT and a transmission channel power saving operation of the OLT, upon detection that the traffic intensity is below the predetermined level.

In yet another example aspect, a method of communication includes detecting, by an optical line terminal (OLT), an actual distance between the OLT and an optical network unit (ONU), comparing, by the OLT, the actual distance with a predetermined distance set by default, instructing, by the OLT, the ONU to enter a power saving mode, upon determination that the actual distance is shorter than the predetermined distance, and performing, by the OLT, at least one of a reception channel power saving operation of the OLT and a transmission channel power saving operation of the OLT, upon determination that the actual distance is shorter than the predetermined distance.

In yet another example aspect, a method of communication includes detecting, by an optical network unit (ONU), absence of a service data transmission from a remote unit or a power saving flag transmitted from a remote unit, notifying, by the ONU, an optical line terminal (OLT) to enter a power saving mode, upon detection of the absence of the service data transmission from the remote unit or upon detection or the power saving flag, and performing, by the ONU, at least one of a reception channel power saving operation of the ONU and a transmission channel power saving operation of the ONU, upon detection of the absence of the service data transmission from the remote unit or upon detection or the power saving flag.

In yet another example aspect, a method of communication includes detecting, an optical network unit (ONU), a power saving flag, receiving, by the ONU, information regarding start and end time for a sleep window of a receiver of the ONU and start and end time for an awake window of a receiver of an optical line terminal (OLT), periodically opening, by the ONU, a window to check for a wake-up message, and notifying, by the ONU, the OLT of a resumption of operations during the awake window of the receiver of the OLT, upon receipt of the wake-up message.

In yet another example aspect, an optical transceiver apparatus includes an I/O interface coupled via an optical transmission medium to another optical transceiver apparatus, a memory to store executable instructions, and a processor in communication with the receiver. The processor is configured to detect, by an optical line terminal (OLT), a traffic intensity of an upstream channel from an optical network unit (ONU) to the OLT, during a predetermined detection period, instruct, by the OLT, the ONU to enter a power saving mode, upon detection that the traffic intensity is below a predetermined level, and perform, by the OLT, at least one of a reception channel power saving operation of the OLT and a transmission channel power saving operation of the OLT, upon detection that the traffic intensity is below the predetermined level.

In yet another example aspect, an optical transceiver apparatus includes an I/O interface coupled via an optical transmission medium to another optical transceiver apparatus, a memory to store executable instructions, and a processor in communication with the receiver. The processor is configured to detect, by an optical line terminal (OLT), a service change to an optical network unit (ONU) from a higher data rate service to a lower data rate service, instruct, by the OLT, the ONU to enter a power saving mode, upon detection of the service change, and perform, by the OLT, at least one of a reception channel power saving operation of the OLT and a transmission channel power saving operation of the OLT, upon detection that the traffic intensity is below the predetermined level for a predetermined period of time.

In yet another example aspect, a computer program product includes a computer readable memory having executable instructions stored thereupon. The executable instructions, when executed, causes a processor to detect, by an optical line terminal (OLT), an actual distance between the OLT and an optical network unit (ONU), compare, by the OLT, the actual distance with a predetermined distance set by default, instruct, by the OLT, the ONU to enter a power saving mode, upon determination that the actual distance is shorter than the predetermined distance, and perform, by the OLT, at least one of a reception channel power saving operation of the OLT and a transmission channel power saving operation of the OLT, upon determination that the actual distance is shorter than the predetermined distance.

In yet another example aspect, a computer program product includes a computer readable memory having executable instructions stored thereupon. The executable instructions, when executed, causes a processor to detect, by an optical network unit (ONU), absence of a service data transmission from a remote unit or a power saving flag transmitted from a remote unit, notify, by the ONU, an optical line terminal (OLT) to enter a power saving mode, upon detection of the absence of the service data transmission from the remote unit or upon detection or the power saving flag, and perform, by the ONU, at least one of a reception channel power saving operation of the ONU and a transmission channel power saving operation of the ONU, upon detection of the absence of the service data transmission from the remote unit or upon detection or the power saving flag.

In yet another example aspect, a computer program product includes a computer readable memory having executable instructions stored thereupon. The executable instructions, when executed, causes a processor to detect, an optical network unit (ONU), a power saving flag, receive, by the ONU, information regarding start and end time for a sleep window of a receiver of the ONU and start and end time for an awake window of a receiver of an optical line terminal (OLT), periodically open, by the ONU, a window to check for a wake-up message, and notify, by the ONU, the OLT of a resumption of operations during the awake window of the receiver of the OLT, upon receipt of the wake-up message.

These and other aspects, and their implementations and variations are set forth in the drawings, the description and the claims.

BRIEF DESCRIPTION OF THE DRAWINGS

FIG. 6 illustrates two different types of PONs.

FIG. 9 illustrates a power management method based on an embodiment of the disclosed technology.

FIG. 11 illustrates a power management method based on another embodiment of the disclosed technology.

FIG. 12 illustrates a power management method based on another embodiment of the disclosed technology.

FIG. 13 illustrates a power management method based on another embodiment of the disclosed technology.

FIG. 15 illustrates a power management method based on another embodiment of the disclosed technology.

DETAILED DESCRIPTION

A passive optical network (PON) includes an optical line terminal (OLT), an optical network units (ONU), and an optical network. In a PON, the OLT at a network operator's central office serves a plurality of ONUs at end users through a single optical distribution network. A wavelength division multiplexing (WDM)-PON provides each ONU and sub-scribers connected to such an ONU with at least one dedicated pair of wavelength channels including down-stream and upstream, creating logical peer-to-peer data connections between the OLT and the ONU. The WDM-PON does not require multiple access techniques for the upstream direction as a dedicated upstream wavelength channel is continuously available to each ONU.

Figure 1:
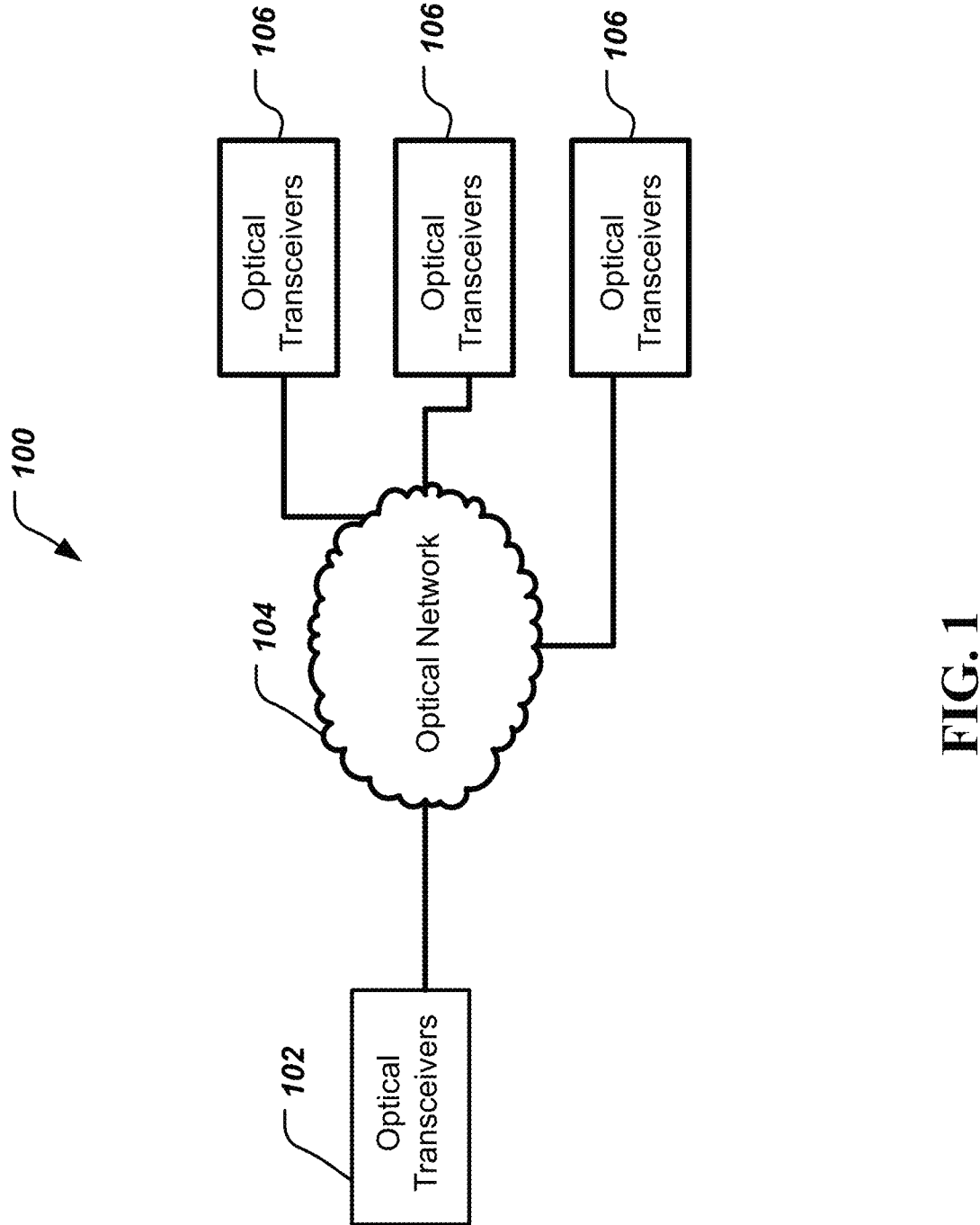
FIG. 1 illustrates an example optical communication network.

FIG. 1 illustrates an example optical communication network 100 in which the presently disclosed technology can be embodied. In the optical communication network 100, one or more optical transceivers 102 are communica-tively coupled via an optical network 104 to one or more optical transceivers 106. Here, examples of the optical network 104 may include the PON. The optical network 104 may include optical fibers that extend in length from several hundred meters (e.g., last mile drop) to several thousands of kilometers (long haul networks). In some embodiments of the disclosed technology, the more or more optical trans-ceivers 102 may include the OLT, and the optical transceiver 106 may include the ONU. The transmitted optical signals may go through intermediate optical equipment such as amplifiers, repeaters, switch, etc., which are not shown in FIG. 1 for clarity.

Figure 2:
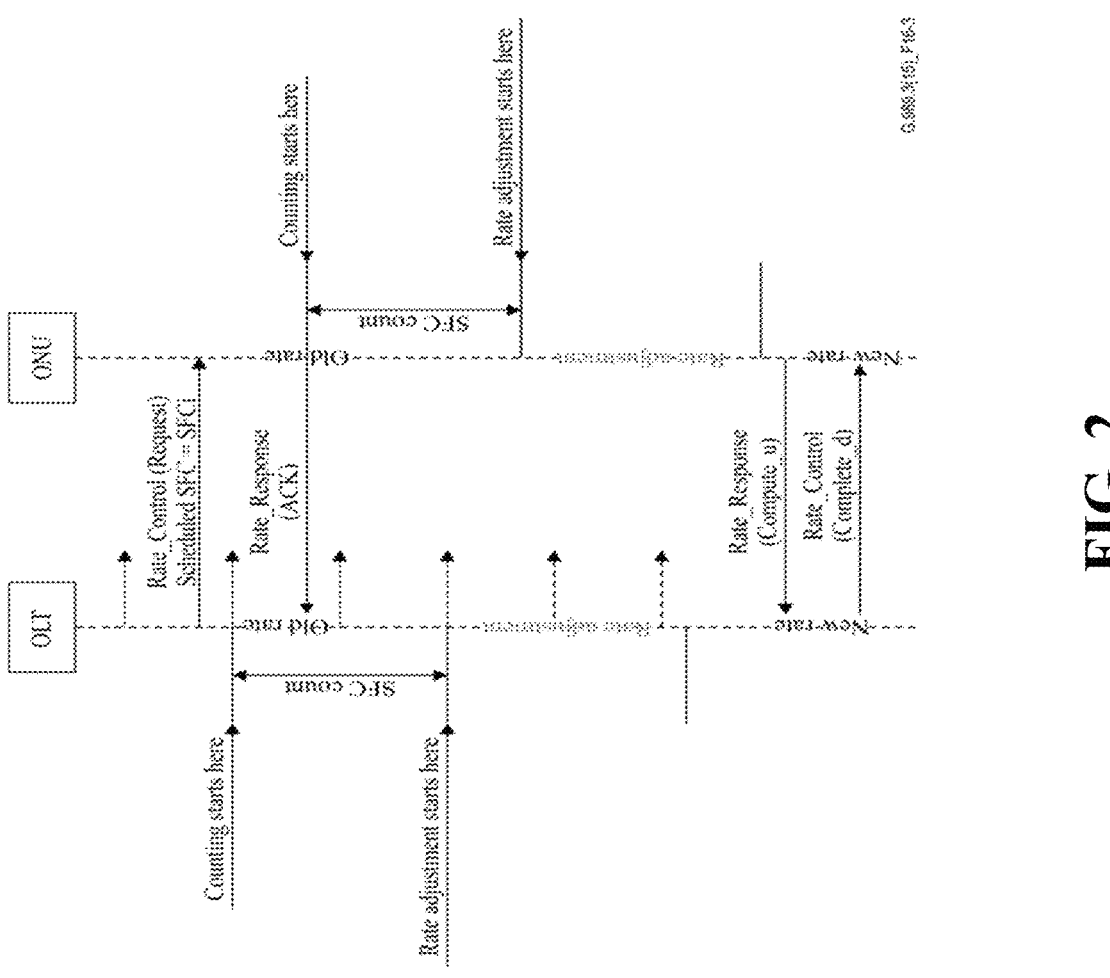
FIG. 2 illustrates an example power management method for point to point wavelength division multiplexing (PtP WDM) channel.

FIG. 2 illustrates an example power management method for point to point wavelength division multiplexing (PtP WDM) channel. This figure can also be found in Interna-tional Telecommunication Union (ITU) standard G.989.3. When the OLT and ONUs operate in the continuous mode at multiple levels of line rates, power saving can be achieved via line rate adjustment. When the OLT detects low band-width situation in a PtP WDM link, it may command the associated ONU to adjust the transmit/receive rates to a lower level. This introduces power consumption reduction on both the OLT and ONU sides. The control and manage-ment messages for line rate adjustment are transmitted in the PtP WDM management channel.

The OLT and an ONU may change their line rate respectively. For example, line rate adjustment sequences are executed by exchanging upstream and downstream physical layer operation, administration and maintenance (PLOAM) messages. A downstream PLOAM message (e.g., Rate_Control "Request") contains an identifier to change its transmitter and receiver line rate, a timing to start ONU's line rate adjustment (e.g., Scheduled SFC), and the target line rate. The ONU should check its own status whether it can start the procedure of line rate adjustment.

When the line rate adjustment requirement is acceptable for the ONU, the ONU sends a PLOAM message (e.g., Rate_Response) for acknowledgement. Both the OLT and ONU start line rate adjustment at a certain timing (e.g., the scheduled SFC assigned in the Rate_Control PLOAM message). When the ONU cannot accept line rate adjustment, it sends a PLOAM message indicating that the line rate adjustment requirement is not acceptable.

After the ONU establishes re-synchronization with the downstream signal at the target line rate, the ONU sends an upstream PLOAM message (e.g., Rate_Response "Complete_u") to notify that the line rate adjustment successes. When the OLT receives this upstream PLOAM message from the ONU, the OLT sends a downstream PLOAM message (e.g., Rate_Control "Complete_d") to the ONU to recognize completion of line rate adjustment.

Figure 3:
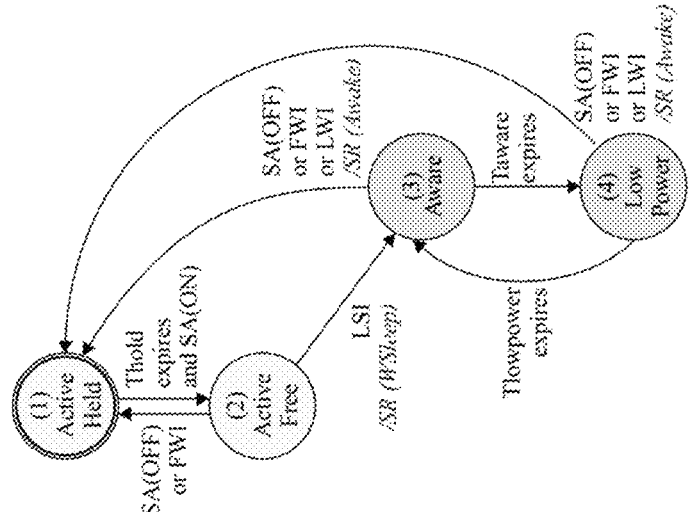
FIG. 3 illustrates an example power management method for time and wavelength division multiplexing (TWDM) channel.

FIG. 3 illustrates an example power management method for time and wavelength division multiplexing (TWDM) channel. This figure can also be found in ITU standard G.989.3. In the figure, "SA(ON)" indicates "Sleep_Allow (ON)," "SA(OFF)" indicates "Sleep_Allow(OFF)," "LSI" indicates "local sleep indication," "FWI" indicates "forced wake-up indication," and "LWI" indicates "local wake-up indication. In some implementations, the OLT may use an ONU management and control interface (OMCI) to discover the ONU's power management capabilities and to configure its power management attributes. To control the power management behavior of a given ONU, the ONU and the OLT maintain a pair of power management state machines. The ONU state machine and the corresponding OLT state machine operate in partial state alignment. The primary signaling mechanism used to coordinate the ONU and OLT state machines is based on the PLOAM messages. The output PLOAM messages are generated and queued for transmission at the time of state transitions. The states of both ONU and OLT state machines can be classified into two subsets: the full power states and the low power states. Only the state transitions between the full power and low power state subsets generate an output PLOAM message. The ONU power management states along with their corresponding semantic description are listed in Table 1.

TABLE 1

| State | Semantics |
|---|---|
| (1) ActiveHeld | The ONU is fully responsive, forwarding downstream traffic and responding to all bandwidth allocations. Power management state transitions do not occur. The minimum sojourn in this state is enforced by the Thold timer. Upon entrance to this state, the ONU sends a Sleep_Request (Awake) PLOAM message. On the state diagrams, this is abbreviated as SR(Awake). |
| (2) ActiveFree | The ONU is fully responsive, forwarding downstream traffic and responding to all bandwidth allocations. Power management state transition requests are a local decision. |
| (3) Aware | Both ONU receiver and transmitter remain on. This state persists for a specified duration Iaware if not truncated by the arrival of a local stimulus LWI or receipt of SA(OFF) from the OLT CT. The ONU forwards downstream traffic and responds to all grant allocations. It is the responsibility of the OLT CT to transmit bandwidth allocations containing the PLOAMu flag with frequency sufficient to ensure that an aware ONU sees at least one. |
| (4) LowPower | The ONU transmitter is off. The ONU periodically checks the downstream signal for remote wake-up indications. When the downstream signal is checked, the ONU does not respond to grant allocations and does not forward downstream traffic. This state persists for a specified duration Ilowpower if not truncated by the arrival of a local stimulus LWI or receipt of SA(OFF) or FWI from the OLT CT. Before exiting this state, the ONU ensures that it is fully powered up and capable of responding to both upstream and downstream traffic and control. |

Table 2 shows examples of input events.

TABLE 2

| Input categories | Input | Semantics |
|---|---|---|
| PLOAM events | Sleep_Allow(ON) | The OLT CT grants permission to the ONU to exercise watchful sleep management mode. |
| | Sleep_Allow(OFF) | The OLT CT withholds consent to exercise a power management mode. |

TABLE 2-continued

| Input categories | Input | Semantics |
|---|---|---|
| Bit-indication event | Forced wake-up indication (FWI) | Transmitting FWI as a flag of an allocation structure, the OLT CT requires immediate ONU wake-up and its transition to the ActiveHeld state. |
| Timer events | Thold expiration | The event applies in the ActiveHeld state, controlling the minimum sojourn in that state. |
| | Taware expiration | The event applies in the Aware state, controlling the sojourn in that state. |
| | Tlowpower expiration | The event applies in the LowPower state, controlling the sojourn in that state. |
| Local events | Local sleep indication (LSI) | The ONU has no local reason to remain at full power and is willing to exercise the watchful sleep power management mode. |
| | Local wake-up indication (LWI) | A local stimulus prevents the ONU from exercising any power management mode. |

NOTE
The LSI and LWI events are conceptually derived from the ONU's binary stimulus status level (Awake/Sleep) and correspond to the events of the level change or, in case of ActiveFree state, to the sampled value at the time of the transition. The specific criteria for the local stimulus definition remain out of scope of this Recommendation.

The OLT sends a downstream message (e.g., Sleep_Allow) at its discretion to enable or disable ONU power saving in real time. If the ONU power management has been enabled via OMCI, the ONU response is controlled by the state machine. Otherwise, the ONU ignores the message.

TABLE 3

| Message type ID | Message name | Function | Trigger | Effect of receipt |
|---|---|---|---|---|
| 0x0D | Key_Control | The OLT instructs the ONU to generate a new data encryption key or to confirm an existing data encryption key | At the OLT's discretion. | Send one Key_Report message for each 32-byte fragment of response content. |
| 0x12 | Sleep_Allow | To enable or disable ONU power saving in real time. | At the OLT's discretion | If the ONU power management has been enabled via OMCI, the ONU response is controlled by the state machine of clause 16. Otherwise, the ONU ignores the message. |

If ONU power management has not been enabled via OMCI, the ONU discards this message. Table 4 shows the use and function of this message in detail.

TABLE 4

| Octet | Content | Description |
|---|---|---|
| 1-2 | ONU-ID | Directed or broadcast ONU-ID. As a broadcast message, ONU-ID = 0x03FF. |
| 3 | 0x12 | Message type ID "Sleep_Allow". |
| 4 | SeqNo | Unicast or broadcast PLOAM sequence number, as appropriate |
| 5 | 0000 000A | This byte is a bit field with the following significance: A = 0-Sleep allowed OFF. A = 1-Sleep allowed ON. Other values reserved. |
| 6-40 | Padding | Set to 0x00 by the transmitter; treated as "don't care" by the receiver |
| 41-48 | MIC | Message integrity check |

Table 5 shows examples of upstream messages.

TABLE 5

| Message ID | Message name | Function | Trigger |
|---|---|---|---|
| 0x05 | Key_Report | To send a fragment of a new data encryption key or a hash of an existing data encryption key | In response to Key_Control message from the OLT |
| 0x09 | Acknowledgement | To indicate reception of specified downstream messages. Also used for no-op, error and busy responses | Upon receipt of a downstream message that requires acknowledgement. Also to report busy, error or no upstream message |
| 0x10 | Sleep_Request | To signal the ONU's intention to start or terminate power saving | Under state machine control |

An ONU sends an upstream message (e.g., Sleep_Request) to signal its intention to start or terminate power saving. Table 6 shows the use and function of this message in detail.

TABLE 6

| Octet | Content | Description |
|---|---|---|
| 1-2 | ONU-ID | Sender identity |
| 3 | 0x10 | Message type ID "Sleep_Request" |
| 4 | SeqNo | Always 0 |
| 5 | Activity_level | 0: Sleep_Request (Awake). Non-zero values of the parameter indicate a request to initiate a specific power management mode: ONU alternates between an Aware state (SleepAware, DozeAware, or WatchAware), when the ONU receives and transmits traffic, and a corresponding LowPower state (Asleep, Listen, or Watch), when the ONU does not transmit upstream. 1: Sleep_Request (Doze). Doze mode request: when in a LowPower state (the Listen state) the ONU receiver remains active, the ONU can receive downstream traffic. 2: Sleep_Request (Sleep). Cyclic sleep mode request: when in a LowPower state (the Asleep state), the ONU receiver is inactive; the ONU cannot receive downstream traffic. 3: Sleep_Request (WSleep). Watchful sleep mode request: when in a LowPower state (the Watch state), the ONU periodically checks the downstream traffic for wakeup indications from the OLT. Other values reserved |
| 6-40 | Padding | Set to 0x00 by the transmitter; treated as "don't care" by the receiver |
| 41-48 | MIC | Message integrity check |

Figure 4:
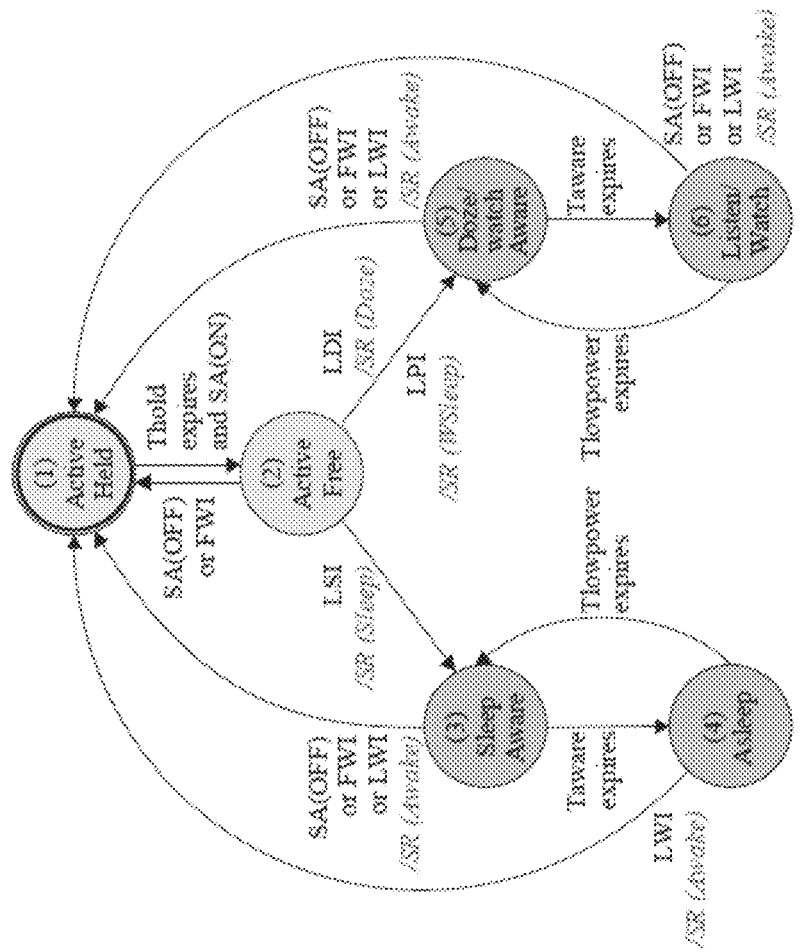
FIG. 4 illustrates an example of ONU state transition diagram.

FIG. 4 illustrates an example of ONU state transition diagram. This figure can also be found in ITU standard G. 987.3. In this state diagram graph, vertices corresponding to states (1) and (2) can be qualified as tense and form a tense subgraph, whereas vertices corresponding to states (3), (4), (5) and (6) can be qualified as "relaxed" and form a relaxed subgraph. As a rule, an output PLOAM message is generated only on a state transition that crosses the subgraph boundary.

The use of the right-hand-side branch of the state machine depends on the power mode negotiations between the OLT and the ONU. If the Doze or Doze & Cyclic Sleep modes are selected, the LDI condition applies, and the states are named (5) DozeAware and (6) Listen. If the Watchful sleep mode is selected, the LPI condition applies, and the states are named (5) WatchAware and (6) Watch. However, all the transitions remain exactly the same, which is the reason to combine them graphically.

Figure 5:
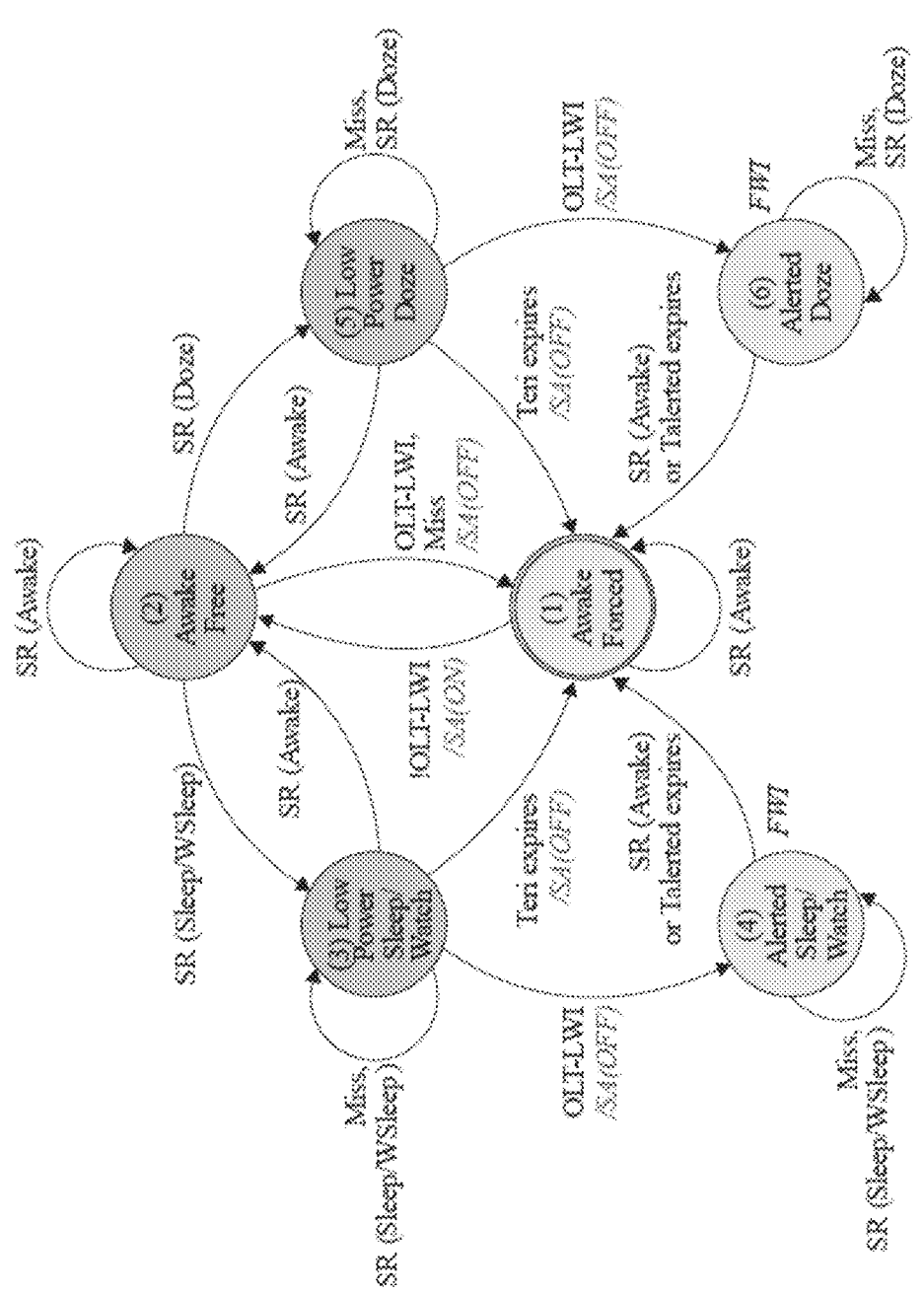
FIG. 5 illustrates an example of OLT state transition diagram.

FIG. 5 illustrates an example of OLT state transition diagram. This figure can also be found in ITU standard G. 987.3. In this state diagram graph, vertices corresponding to states (1), (4) and (6) can be qualified as "tense" and form a tense subgraph, whereas vertices corresponding to states (2), (3) and (5) can be qualified as "relaxed" and form a relaxed subgraph. As a rule, an output PLOAM message is generated only on a state transition that crosses the subgraph boundary.

The use of the left-hand-side branch of the state machine depends on the power mode negotiations between the OLT and the ONU. If the Doze or Doze & Cyclic Sleep modes are selected, the SR(Sleep) condition applies, and the states are named (3) LowPowerSleep and (4) AlertedSleep. If the Watchful sleep mode is selected, the SR(WSleep) condition applies, and the states are named (3) LowPowerWatch and (4) AlertedWatch. However, all the transitions and state semantics remain exactly the same, which is the reason to combine them graphically.

Table 7 shows examples of ONU power management states.

TABLE 7

| State | Semantics |
| --- | --- |
| ActiveHeld | The ONU is fully responsive, forwarding downstream traffic and responding to all bandwidth allocations. Power management state transitions do not occur. The minimum sojourn in this state is enforced by the Thold timer. Upon entry to this state, the ONU sends a Sleep_Request (Awake) PLOAM message. On the state diagrams, this is abbreviated as SR(Awake) |
| ActiveFree | The ONU is fully responsive, forwarding downstream traffic and responding to all bandwidth allocations. Power management state transition requests are a local decision |
| Asleep | The ONU shuts down both its receiver and transmitter, retaining the ability to wake up on local stimulus. This state persists for a specified duration Ilowpower, if not truncated by the arrival of a local stimulus LWI. Before exiting this state, the ONU ensures that it is fully powered up, synchronized, and capable of responding to both upstream and downstream traffic and control |
| Listen | The ONU receiver is on; the transmitter is off. The ONU listens to the downstream signal and forwards downstream traffic, while retaining the ability to reactivate the transmitter on local or remote stimulus. This state persists for a specified duration Ilowpower, if not truncated by the arrival of a local stimulus LWI or receipt of SA(OFF) or FWI from the OLT. Before exiting this state, the ONU ensures that it is fully powered up and capable of responding to both upstream and downstream traffic and control. |
| Watch | The ONU transmitter is off. The ONU periodically turns on the receiver for a brief time to check the downstream signal for remote wakeup indications. When the downstream signal is checked, the ONU does not respond to bandwidth allocations and does not forward downstream traffic. This state persists for a specified duration Ilowpower, if not truncated by the arrival of a local stimulus LWI or receipt of SA(OFF) or FWI from the OLT. Before exiting this state, the ONU ensures that it is fully powered up and capable of responding to both upstream and downstream traffic and control |
| DozeAware SleepAware WatchAware | Both ONU receiver and transmitter remain on. This state persists for a specified duration Iaware, if not truncated by the arrival of a local stimulus LWI or receipt of SA(OFF) or FWI from the OLT. The ONU forwards downstream traffic and responds to all bandwidth allocations. It is the responsibility of the OLT to transmit bandwidth allocations containing the PLOAMu flag with frequency sufficient to ensure that an aware ONU sees at least one. |
| AwakeForced | The OLT provides normal allocations to ONU i, forwards downstream traffic, and expects a response to every bandwidth grant. The OLT declares the LOBi defect on detection of the specified number of missed allocations. On transition into this state, the OLT sends a Sleep_Allow (OFF) PLOAM message, thus revoking its permission to the ONU to enter any low power mode. |
| Awake Free | The OLT provides normal allocations to the ONU, forwards downstream traffic, and is ready to accept a power management transition indication from the ONU. On transition into this state, the OLT sends a Sleep_Allow (ON) PLOAM message, thus granting the ONU a permission to enter any negotiated low power mode at its own discretion. The OLT expects a response to every bandwidth grant, and in case of a missed allocation transitions to the AwakeForced state, where LOBi condition can be eventually declared. There are two stable state combinations involving the AwakeFree state of the OLT state machine: the ONU state machine can be either in the ActiveFree state or in the ActiveHeld state. |
| LowPowerSleep LowPowerDoze LowPowerWatch | The OLT supports the ONU in a low power mode. The OLT provides normal allocations to the ONU but expects only intermittent responses from the ONU to bandwidth grants. In the LowPowerDoze state, the OLT forwards the downstream traffic; in the LowePowerSleep and LowPowerWatch states, the OLT may buffer the downstream traffic. If timer Teri expires before the OLT receives a burst from ONU i, the OLT recognizes a handshake violation and transitions to the AwakeForced state. |
| AlertedSleep AlertedDoze AlertedWatch | The OLT attempts to wake up the ONU. Having sent Sleep_Allow (OFF) message on transition to the state, the OLT sets the FWI bit in every allocation to the ONU along with the PLOAMu flag. The OLT forwards, discards or buffers downstream traffic for the ONU, just as it did during the immediately preceding LowPowerDoze/Sleep/Watch state. The OLT transitions to the AwakeForced state, if it receives a burst from the ONU that includes a Sleep_Request (Awake) PLOAM message, or if timer Talerted expires. |

55

FIG. 6 illustrates two different types of PONs. There are different types of PONs depending on the data multiplexing scheme. The currently deployed PON technologies include time division multiplexing (TDM) PON and wavelength division multiplexing (WDM) PON. In the TDM PON, traffic from/to multiple ONUs are TDM multiplexed onto the upstream/downstream wavelength. On the other hand, the WDM PON uses multiple wavelengths to provide bandwidth to ONUs.

Figure 7:
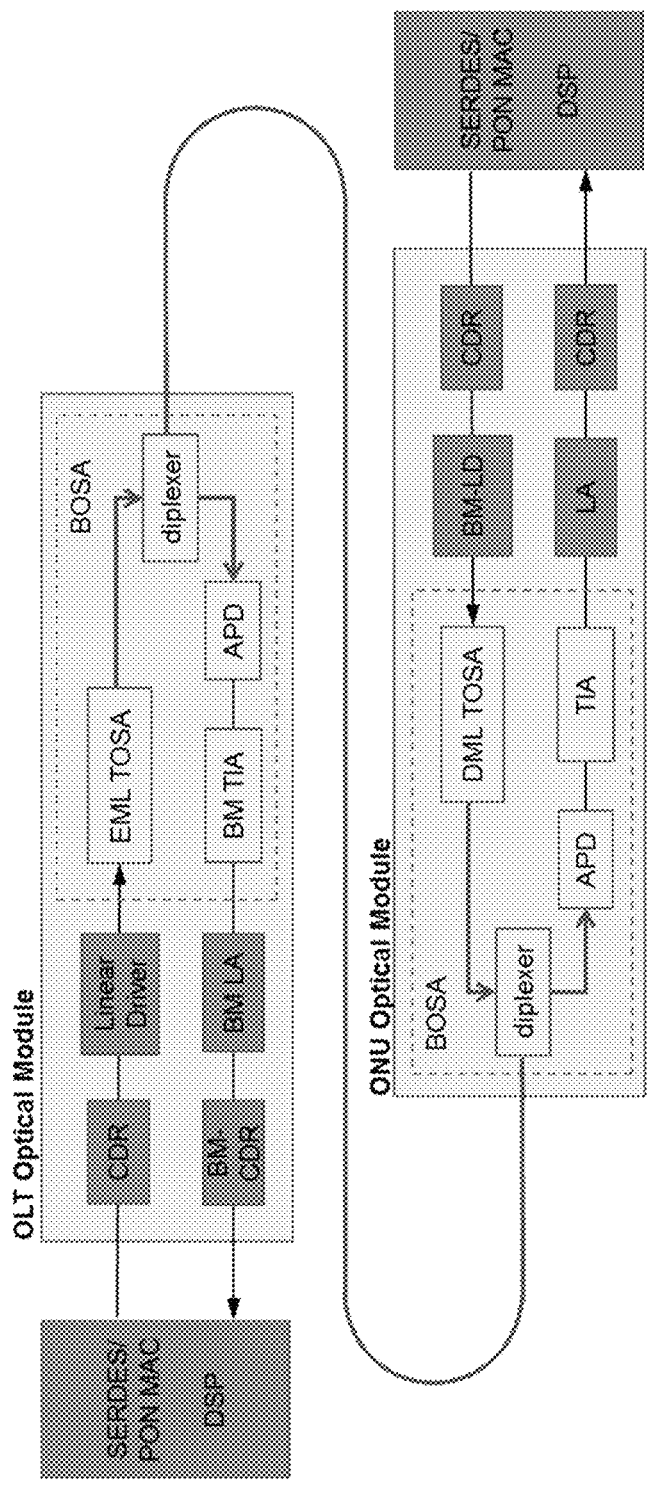
FIG. 7 illustrates examples of transceiver components.

FIG. 7 illustrates examples of transceiver components. In some embodiments of the disclosed technology, an OLT optical module may include a digital signal processer DSP and a bidirectional optical assembly BOSA. The digital signal processer DSP includes clock data recovery circuitry CDR, a linear driver, a burst mode clock data recovery circuitry BM-CDR, and a burst mode limiting amplifier BM LA. The bidirectional optical assembly BOSA includes an externally modulated laser (EML) transmitter optical assembly (TOSA), a diplexer, an avalanche photo diode APD, and a burst mode trans-impedance amplifier BM TIA.

In some embodiments of the disclosed technology, an ONU optical module may include a digital signal processer DSP and a bidirectional optical assembly BOSA. The digital signal processer DSP includes clock data recovery circuitry CDR, a burst mode laser diode, and a limiting amplifier LA. The bidirectional optical assembly BOSA includes a diplexer, a directly modulated laser (DML) transmitter optical assembly (TOSA), a photo diode APD, and a transimpedance amplifier TIA.

Figure 8:
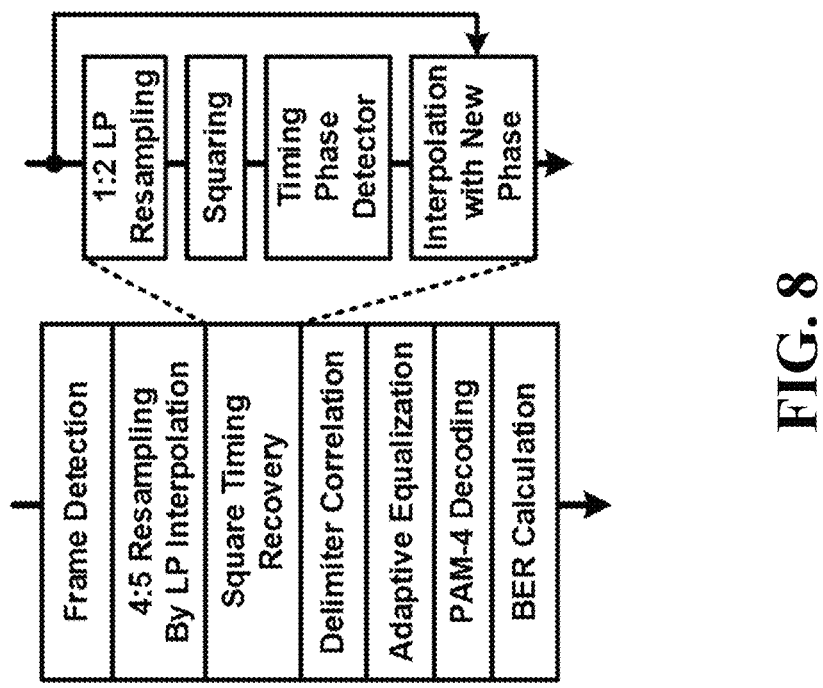
FIG. 8 illustrates example components for digital signal processing (DSP) that can be implemented in ONU.

FIG. 8 illustrates example components for digital signal processing (DSP) that can be implemented in ONU. The DSP in ONU may include a frame detection, resampling by interpolation, square timing recovery, delimiter correlation, adaptive equalization, decoding based on a modulation scheme, and bit error rate (BER) calculation. The square timing recovery may include resampling, squaring, timing phase detector, and interpolation with new phase.

Both TDM-PON and WDM-PON are being included in higher speed PON standards. Existing WDM-PON power saving mechanism relies on reducing line rates. As discussed above, The PtP WDM OLT and ONUs operate in the continuous mode at multiple levels of line rates, power consumption can be achieved via line rate adjustment. When the OLT detects low bandwidth situation in a PtP WDM link, it would command the associated ONU to adjust the transmit and receive rates to a lower level. This introduces power consumption reduction on both the OLT and ONU sides. The line rate adjustment control and management messages are transmitted in the PtP WDM management channel.

For TDM-PON, mechanisms for power saving in ASIC (switching off FEC) and in optical module (switching off laser, and various Sleep Modes) are specified. In the future, high speed PON targeting 50 Gb/s and above will need additional power saving mechanisms in addition to the existing methods. For 50G+ PON, DSP for dispersion and nonlinear equalization is expected. As DSP is a highly power-hungry component, mechanisms to reduce its power consumption are needed.

Some embodiments of the disclosed technology provide methods to reduce overall power consumption. The methods may include determining whether the system should enter power saving mode, initiating the system to enter power saving mode, and detecting traffic condition and determine if the system should resume normal operation. In initiating the system to enter power saving mode, part or all of the DSP functions are dynamically switched off depending on the power saving mode. In case of WDM PON, an OLT-ONU coordinated sleep mode may be implemented. Here, one or more PLOAM messages may be issued to perform the above tasks.

FIG. 9 illustrates an example power management method 900 based on an embodiment of the disclosed technology. The method 900 includes, at step 902, notifying, by an optical line terminal (OLT), an optical network unit (ONU) a first time period assigned to a first power saving operation and a second time period assigned to a second power saving operation, and at step 904, performing, by the OLT, the second power saving operation for a receiver of the OLT during the second time period and the first power saving operation for a transmitter of the OLT during the first time period.

The method 900 may further include, during the second time period, periodically opening, by the OLT, an awake window to check for a wake-up message from the ONU. The method 900 may further include, during the second time period, receiving a wake-up message for the ONU to resume communication with the OLT.

The first time period may be set upon detection of a decrease in a traffic intensity of an upstream channel from the ONU to the OLT during a predetermined detection period. The first time period may be set upon detection of a service change to the ONU from a higher data rate service to a lower data rate service below a predetermined data rate. The first time period may be set upon determination that an actual communication distance between the OLT and the ONU is shorter than a predetermined communication distance. The first time period may be set upon detection of an absence of a service data transmission from a remote unit in a mobile fronthaul network. The first time period may be set upon detection of a power saving flag transmitted from a remote unit in a mobile fronthaul network. Here, switching the modulation format may include switching a modulation format for transmission to non-return to zero (NRZ) modulation format. At least one of the first and second power saving operations may include reducing a transmission rate of a transmission between the OLT and the ONU. The first and second power saving operations may include reducing a transmission power of a transmission between the OLT and the ONU. The first and second power saving operations may include switching off a transmitter laser for a communication between the OLT and the ONU. The first and second power saving operations may include switching off circuitry for nonlinear compensation for a communication between the OLT and the ONU. The first and second power saving operations may include switching off a forward error correction function for a communication between the OLT and the ONU. The first and second power saving operations may include switching off at least one of digital signal processing functions. The first and second power saving operations may include switching a modulation format for a communication between the OLT and the ONU.

Figure 10:
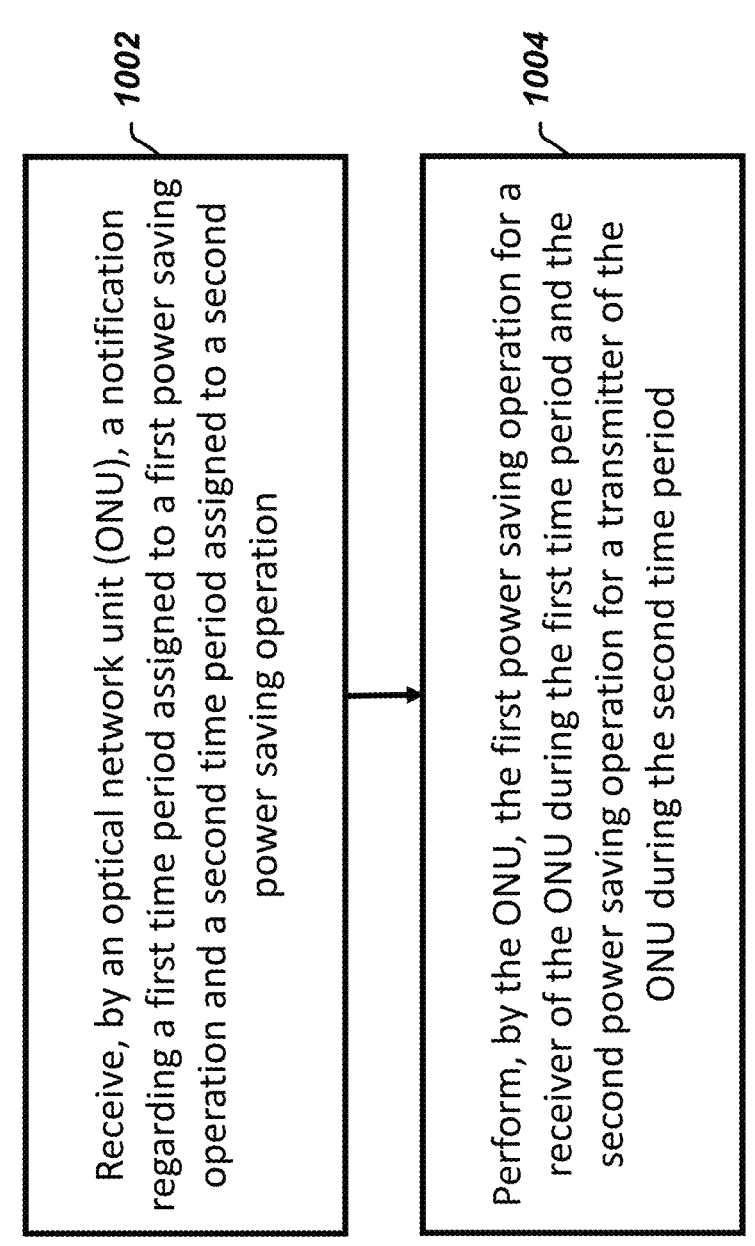
FIG. 10 illustrates a power management method based on another embodiment of the disclosed technology.

FIG. 10 illustrates an example power management method 1000 based on another embodiment of the disclosed technology. The method 1000 includes, at step 1002, receiving, by an optical network unit (ONU), a notification regarding a first time period assigned to a first power saving operation for the ONU and a second time period assigned to a second power saving operation for an optical line terminal (OLT), and at step 1004, performing, by the ONU, the first power saving operation for a receiver of the ONU during the first time period and the second power saving operation for a transmitter of the OLT during the second time period.

The OLT is configured to periodically open an awake window to check for a wake-up message from the OLT. The method 1000 may further include, during the first time period, sending, by the ONU, a wake-up message to resume communication with the OLT.

The first time period may be set upon detection of a decrease in a traffic intensity of an upstream channel from the ONU to the OLT during a predetermined detection period. The first time period may be set upon detection of a service change to the ONU from a higher data rate service to a lower data rate service below a predetermined data rate. The first time period may be set upon determination that an actual communication distance between the OLT and the ONU is shorter than a predetermined communication distance. The first time period may be set upon detection of an absence of a service data transmission from a remote unit. The first time period may be set upon detection of a power saving flag transmitted from a remote unit. Here, switching the modulation format may include switching a modulation format for transmission to non-return to zero (NRZ) modulation format. The first and second power saving operations may include reducing a transmission rate of a transmission between the OLT and the ONU. The first and second power saving operations may include reducing a transmission power of a transmission between the OLT and the ONU. The first and second power saving operations may include switching off a transmitter laser for a communication between the OLT and the ONU. The first and second power saving operations may include switching off circuitry for nonlinear compensation for a communication between the OLT and the ONU. The first and second power saving operations may include switching off a forward error correction function for a communication between the OLT and the ONU. The first and second power saving operations may include switching off at least one of digital signal processing functions. The first and second power saving operations may include switching a modulation format for a communication between the OLT and the ONU.

FIG. 11 illustrates an example power management method 1100 based on an embodiment of the disclosed technology. The method 1100 includes, at step 1102, detecting, by an optical line terminal (OLT), a traffic intensity of an upstream channel from an optical network unit (ONU) to the OLT, during a predetermined detection period, at step 1104, instructing, by the OLT, the ONU to enter a power saving mode, upon detection that the traffic intensity is below a predetermined level, and, at step 1106, performing, by the OLT, at least one of a reception channel power saving operation of the OLT and a transmission channel power saving operation of the OLT, upon detection that the traffic intensity is below the predetermined level.

The reception channel power saving operation of the OLT may include switching off at least one of digital signal processing functions of a receiver of the OLT. The transmission channel power saving operation of the OLT may include reducing a transmission rate of a transmission of the OLT. The ONU may perform, upon receipt of the instruction to enter the power saving mode, at least one of a reception channel power saving operation of the ONU and a transmission channel power saving operation of the ONU. The reception channel power saving operation of the ONU may include switching off at least one of digital signal processing functions of a receiver of the ONU. The transmission channel power saving operation of the ONU may include reducing a transmission power of a transmission of the ONU. The transmission channel power saving operation of the ONU may include switching off a transmitter laser of the ONU.

In some implementations of the disclosed technology, the power saving can be achieved by reducing upstream and/or downstream traffic. The OLT detects the upstream traffic intensity and determines there is no or low traffic after a predetermined period of time. Alternatively, OLT can detect a message containing a power saving flag from the ONU. The OLT instructs the ONU that the OLT is entering the power saving mode. The OLT performs operations including, for example, switching off part or all of its receiver (Rx) digital signal processing (DSP) functions and/or reducing its transmitter (Tx) line rate. The ONU performs operations including, for example, switching off part or all of its receiver (Rx) DSP function, and/or reducing the transmitter (Tx) power (e.g., watchful sleep) and/or switching off the laser to below threshold (e.g., deep sleep). Here, one or more PLOAM messages may be issued to perform the above tasks.

FIG. 12 illustrates an example power management method 1200 based on another embodiment of the disclosed technology. The method 1200 includes, at step 1202, detecting, by an optical line terminal (OLT), a service change to an optical network unit (ONU) from a higher data rate service to a lower data rate service, at step 1204, instructing, by the OLT, the ONU to enter a power saving mode, upon detection of the service change, and, at step 1206, performing, by the OLT, at least one of a reception channel power saving operation of the OLT and a transmission channel power saving operation of the OLT, upon detection that the traffic intensity is below the predetermined level.

The reception channel power saving operation of the OLT may include switching off circuitry for nonlinear compensation at the OLT. The reception channel power saving operation of the OLT may include switching off at least one of digital signal processing functions of a receiver of the OLT. The transmission channel power saving operation of the OLT may include reducing a transmission rate of a transmission of the OLT. The ONU may perform, upon receipt of the instruction to enter the power saving mode, at least one of a reception channel power saving operation of the ONU and a transmission channel power saving operation of the ONU. The reception channel power saving operation of the ONU may include switching off at least one of digital signal processing functions of a receiver of the ONU. The transmission channel power saving operation of the ONU may include switching a modulation format for transmission to the ONU to non-return to zero (NRZ) modulation format. The OLT may instruct the ONU to enter the power saving mode by instructing the ONU to switch the modulation format for signal reception to the NRZ modulation format.

In some implementations of the disclosed technology, the power saving can be achieved by reducing line rate upon service change. The OLT detects there is a service change from higher data rate service to lower data rate service. At the lower data rate, nonlinear compensation may not be needed or transmitter power can be reduced as receiver (Rx) sensitivity is improved. Some of the DSP functions may not be needed at the lower data rate and can be switched off. The OLT instructs the ONU that the OLT will enter lower rate mode. The OLT performs operations including, for example, switching off part or all of its receiver (Rx) DSP functions, and/or reducing its transmitter (Tx) line rate. The ONU performs operations including, for example, switching off part or all of its receiver (Rx) DSP function. Here, one or more PLOAM messages may be issued to perform the above tasks.

In some implementations of the disclosed technology, the power saving can be achieved by changing modulation format, for example, by simplifying modulation format based on service change. For example, the power saving can be achieved by switching from advanced modulation format (e.g., PAM4) to non-return to zero (NRZ) modulation format. The OLT detects there is a service change from higher data rate service to lower data rate service. At the lower data rate, nonlinear compensation may not be needed or transmitter power can be reduced as the receiver (Rx) sensitivity is improved. Modulation format can be changed from advanced format (e.g. PAM4) to NRZ, which has better receiver (Rx) sensitivity. The OLT instructs the ONU that the OLT will enter lower rate mode and change the modulation format. The OLT performs operations including, for example, switching to the new modulation format and/or switching off part its receiver (Rx) DSP functions. The ONU performs operations including, for example, preparing to receive signal with the new modulation format and/or switching off part or all of its receiver (Rx) DSP function. Here, one or more PLOAM messages may be issued to perform the above tasks.

FIG. 13 illustrates an example power management method 1300 based on another embodiment of the disclosed technology. The method 1300 includes, at step 1302, detecting, by an optical line terminal (OLT), an actual communication distance between the OLT and an optical network unit (ONU), at step 1304, comparing, by the OLT, the actual communication distance with a predetermined communication distance set by default, at step 1306, instructing, by the OLT, the ONU to enter a power saving mode, upon determination that the actual communication distance is shorter than the predetermined communication distance, and, at step 1308, performing, by the OLT, at least one of a reception channel power saving operation of the OLT and a transmission channel power saving operation of the OLT, upon determination that the actual communication distance is shorter than the predetermined communication distance.

The reception channel power saving operation of the OLT may include switching off circuitry for nonlinear compensation at the OLT. The reception channel power saving operation of the OLT may include switching off at least one of digital signal processing functions of a receiver of the OLT. The transmission channel power saving operation of the OLT may include reducing a transmission rate of a transmission of the OLT. The ONU may perform, upon receipt of the instruction to enter the power saving mode, at least one of a reception channel power saving operation of the ONU and a transmission channel power saving operation of the ONU. The reception channel power saving operation may include switching off at least one of digital signal processing functions of a receiver of the ONU. The reception channel power saving operation of the ONU may include switching off a forward error correction function of a receiver of the ONU. The transmission channel power saving operation of the ONU may include switching a modulation format for transmission to the ONU to non-return to zero (NRZ) modulation format. The OLT may instruct the ONU to enter the power saving mode by instructing the ONU to switch the modulation format for signal reception to the NRZ modulation format.

In some implementations of the disclosed technology, the power saving can be achieved by adjusting the maximum reach that the PON can support, based on actual ONU reach distance. Typically at activation, an ONU is set to be at the maximum reach that the PON can support. After activation, the OLT determines the actual ONU reach distance. If it's lower than the maximum value, nonlinear compensation may not be needed or transmitter power can be reduced. The OLT informs the ONU about the actual reach distance and sets the DSP functions accordingly. The OLT performs operations including, for example, setting the DSP functions to a new modulation format, FEC on/off, lower its transmitting optical power, etc. The ONU performs operations including, for example, adjusting receiver (Rx) DSP functions to match the signal, FEC on/off, lower its transmitting optical power, etc. Here, one or more PLOAM messages may be issued to perform the above tasks.

Figure 14:
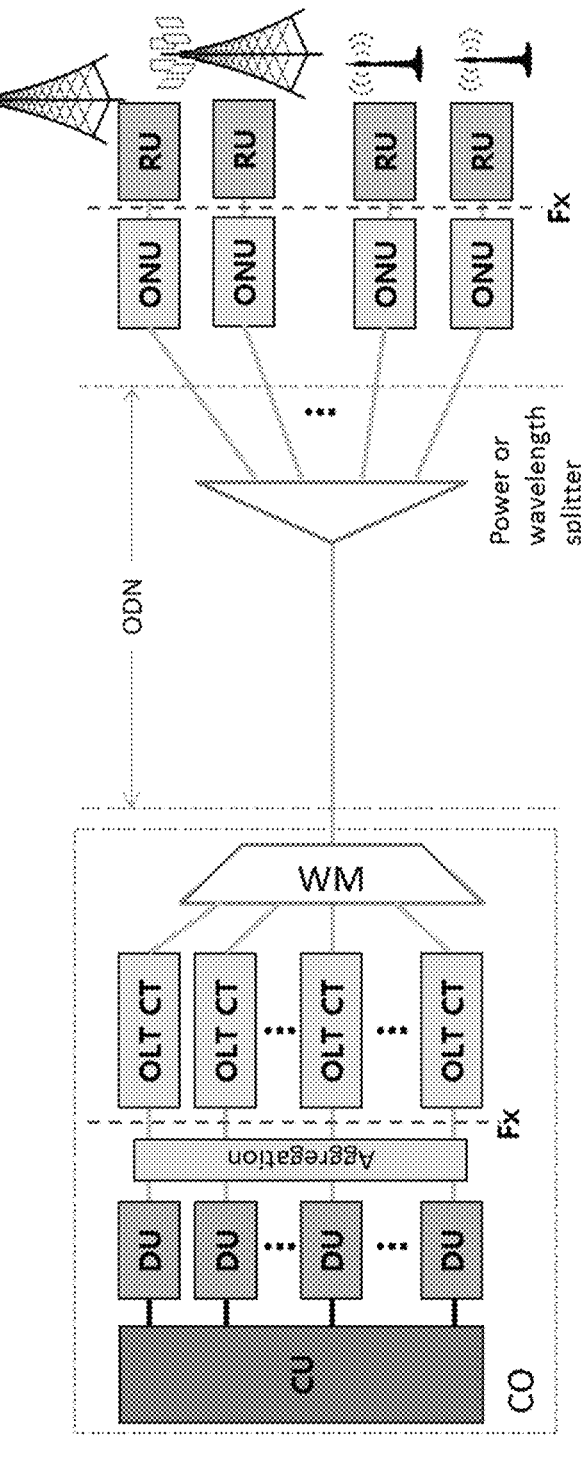
FIG. 14 illustrates an example schematic of 5G transport service.

FIG. 14 illustrates an example schematic of 5G transport service. The power saving scheme implemented based on some embodiments of the disclosed technology can be applied to 5G transport service.

In 5th generation mobile communications systems (5G), the existing wireless fronthaul network needs to be redesigned to meet the future requirements. Passive optical network such as the time division multiplexing-passive optical networks (TDM-PON) and wavelength division multiplexing-passive optical network (WDM-PON) is an excellent candidate for 5G fronthaul communication. 5G networks have significant improvements in throughput, latency and number of connections, compared with 4G networks. This also imposes new challenges on fronthaul networks, including higher fiber density, higher transmission bandwidth, and lower latency.

Where backhaul is the network between a mobile network (e.g., 5G network) and a central unit CN, fronthaul may be the network between distribution units DU and remote units RU. In some implementations of the disclosed technology, the fronthaul network can include distribution units DU, optical line terminal channel terminations OLT CT, an optical distribution network ODN, optical network units ONU, and remote units.

In some embodiments of the disclosed technology, the ONU is configured to detect service data transmitted from a remote unit RU. If the ONU does not receive any signal after a predetermined time, then the ONU may inform OLT to enter power saving mode. If the remote unit RU informs the ONU that it does not have data any more, then the ONU informs the OLT to enter a power saving mode. Here, in some implementations if TDM-PON is used, a coordinated dynamic bandwidth allocation (DBA) interface is needed to communicate such information between the mobile scheduler and the PON scheduler.

FIG. 15 illustrates an example power management method 1500 based on another embodiment of the disclosed technology. The method 1500 includes, at step 1502, detecting, by an optical network unit (ONU), absence of a service data transmission from a remote unit or a power saving flag transmitted from a remote unit, at step 1504, notifying, by the ONU, an optical line terminal (OLT) to enter a power saving mode, upon detection of the absence of the service data transmission from the remote unit or upon detection or the power saving flag, and, at step 1506, performing, by the ONU, at least one of a reception channel power saving operation of the ONU and a transmission channel power saving operation of the ONU, upon detection of the absence of the service data transmission from the remote unit or upon detection or the power saving flag.

The reception channel power saving operation of the ONU may include switching off at least one of digital signal processing functions of a receiver of the ONU. The transmission channel power saving operation of the ONU may include reducing a transmission rate of a transmission of the ONU. The OLT may perform, upon receipt of the notification of the power saving mode, at least one of a reception channel power saving operation of the OLT and a transmission channel power saving operation of the OLT. The reception channel power saving operation of the OLT may include switching off at least one of digital signal processing functions of a receiver of the OLT. The transmission channel power saving operation of the OLT may include reducing a transmission power of a transmission of the OLT. The transmission channel power saving operation of the OLT may include switching off a transmitter laser of the OLT.

Figure 16:
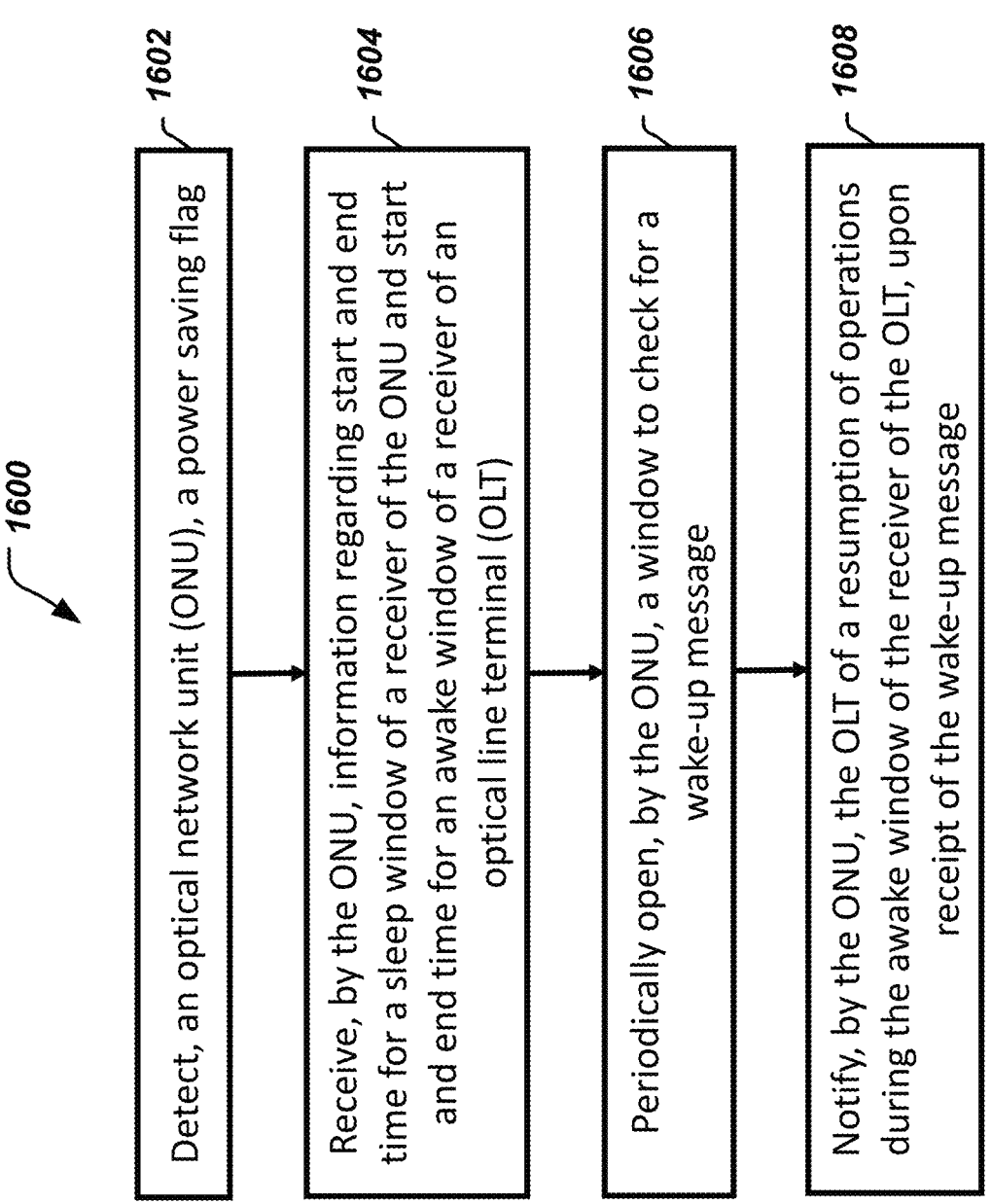
FIG. 16 illustrates a power management method based on another embodiment of the disclosed technology.

FIG. 16 illustrates an example power management method 1600 based on another embodiment of the disclosed technology. The method 1600 includes, at step 1602, detecting, an optical network unit (ONU), a power saving flag, at step 1604, receiving, by the ONU, information regarding start and end time for a sleep window of a receiver of the ONU and start and end time for an awake window of a receiver of an optical line terminal (OLT), at step 1606, periodically opening, by the ONU, a window to check for a wake-up message, and, at step 1608, notifying, by the ONU, the OLT of a resumption of operations during the awake window of the receiver of the OLT, upon receipt of the wake-up message.

The method may further include notifying, by the ONU, the OLT to enter a power saving mode, upon detection of the power saving flag, and performing, by the ONU, at least one of a reception channel power saving operation of the ONU and a transmission channel power saving operation of the ONU, upon detection of the power saving flag. The reception channel power saving operation of the ONU may include switching off at least one of digital signal processing functions of a receiver of the ONU. The transmission channel power saving operation of the ONU may include reducing a transmission rate of a transmission of the ONU. The transmission channel power saving operation of the ONU may include changing a modulation format of a transmission of the ONU. The reception channel power saving operation of the ONU may include switching off a forward error correction function of a receiver of the ONU. The reception channel power saving operation of the ONU may include switching off circuitry for nonlinear compensation at the ONU.

In some embodiments of the disclosed technology, a power saving flag can be used to notify the ONU of the power saving mode. For example, the ONU snoops the signal coming from the remote unit RU to determine if it contains a power saving flag. Upon determination of the power saving flag, the ONU informs the OLT to enter a power saving mode. Here, one or more PLOAM messages may be issued to perform the above tasks.

The OLT and/or the ONU can enter a power saving mode upon detection of a power saving flag. In some embodiments of the disclosed technology, a power saving procedure for WDM-PON may be implemented as follows. The OLT informs the ONU of the start/end time assigned to the ONU's receiver (Rx) sleep window and the start/end time assigned to the OLT's receiver (Rx) awake window. The receiver (Rx) of the ONU periodically opens a window to check for a wake-up message. If the ONU needs to resume operation, then the ONU notifies the OLT during the OLT's awake window that it needs to resume operation. Here, one or more PLOAM messages may be issued to perform the above tasks.

In some embodiments of the disclosed technology, the power saving can be achieved through a digital signal processor (DSP) in the OLT and/or the ONU. For example, the DSP may switch off part or all of its functions to enter the power saving mode. Here, one or more PLOAM messages may be issued to enter the power saving mode. For example, the OLT may provide the ONU with a PLOAM message indicating a switch off of one or more DSP functions such as switching off the forward error correction (FEC) and nonlinear equalization. The OLT may also provide the ONU with a PLOAM message to change the modulation format and/or the line rate. The OLT and ONU both can switch off such functions in DSP. The ONU may instruct its DSP to resume operation if a wake-up message is received.

Figure 17:
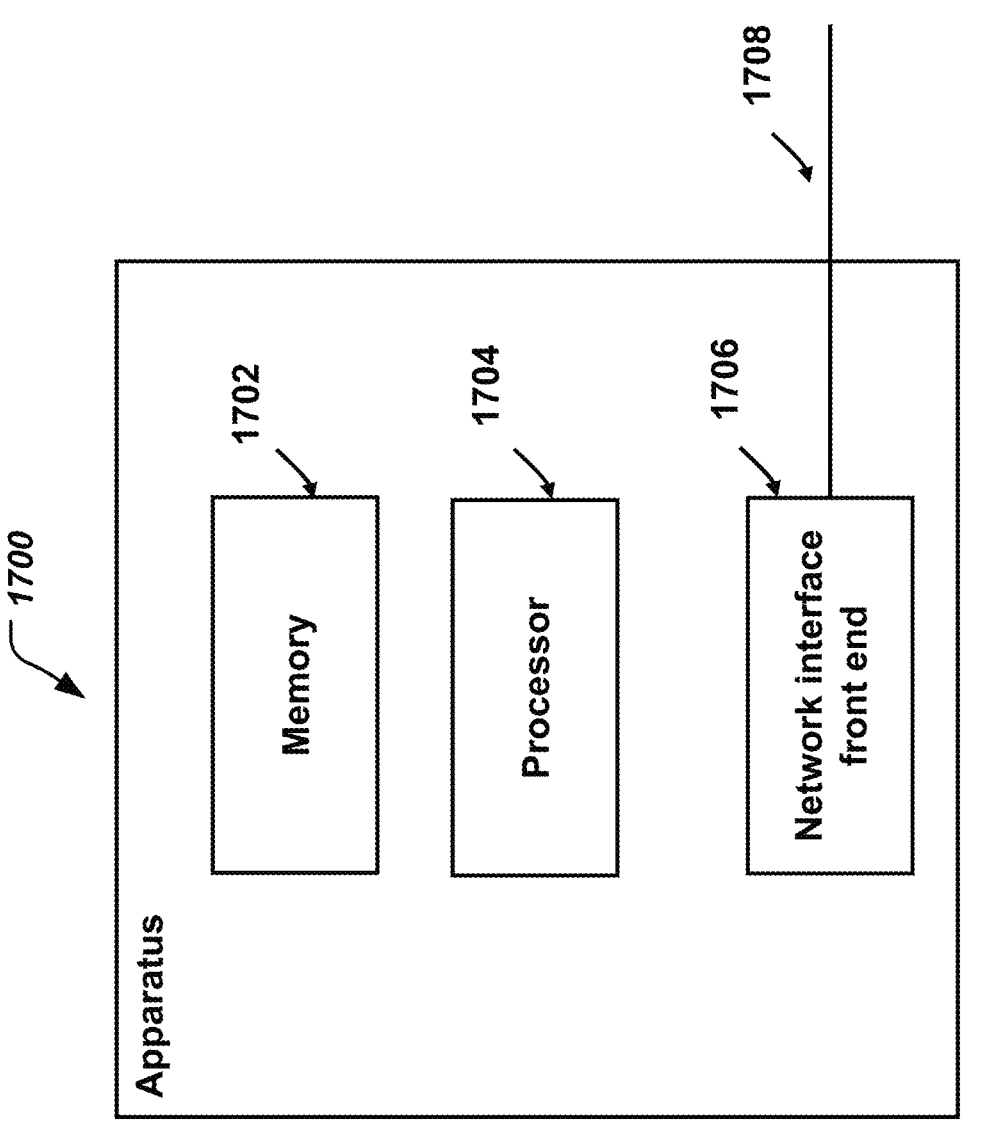
FIG. 17 is a block diagram of an example communication apparatus.

FIG. 17 is a block diagram of an example communication apparatus 1700. The apparatus 1700 may include one or more memories 1702, one or more processors 1704 and a network interface front end 1706 communicatively coupled to a communication link 1708. The one or more memories 1702 may store processor-executable instructions and/or data during processor operation. The one or more processors 1704 may read instructions from the one or memories 1702 and implement a technique described in the present document. The apparatus 1700 may implement various methods including the ONU registration process, periodic status check, and backup options for registration wavelength protection described herein.

As discussed above, next-generation optical access network can implement power efficiency and power saving mechanisms based on various embodiments of the disclosed technology.

The disclosed and other embodiments, algorithms, modules and the functional operations described in the present document can be implemented in digital electronic circuitry, or in computer software, firmware, or hardware, including the structures disclosed in the present document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

In implementing the power efficiency and power saving mechanisms for next-generation optical access network discussed in the present document, a computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the present document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the present document contains many specifics, these should not be construed as limitations on the scope of an invention that is claimed or of what may be claimed, but rather as descriptions of features specific to particular embodiments. Certain features that are described in present document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of communication, comprising:
   detecting, by an optical line terminal (OLT), a service change associated with an optical network unit (ONU) from a first data rate service to a second data rate service, the second data rate service having a lower data rate than the first data rate service;
   comparing, by the OLT, a data rate of the second data rate service with a predetermined data rate with a corresponding reference value; and
   performing, by the OLT, a power saving operation, upon determination that the data rate of the second data rate service is smaller than the predetermined data rate,
   wherein the power saving operation includes at least one of:
      switching off at least a portion of digital signal processing (DSP) functions;
      switching off circuitry for nonlinear compensation;
      switching off a forward error correction (FEC) function; or
      switching a modulation format for communication with the ONU.

2. The method of claim 1, wherein the corresponding reference value is larger than a data rate of the second data rate service and smaller than a data rate of the first data rate service.

3. The method of claim 1, further comprising instructing, by the OLT, the ONU to enter a power saving mode, upon detection of the service change from the first data rate service to the second data rate service.

4. The method of claim 1, wherein the switching the modulation format includes switching a modulation format for transmission to the ONU to non-return to zero (NRZ) modulation format.

5. A method of communication, comprising:
   detecting, by an optical line terminal (OLT), a service change associated with an optical network unit (ONU) from a first data rate service to a second data rate service, the second data rate service having a lower data rate than the first data rate service;
   comparing, by the OLT, a data rate of the second data rate service with a predetermined data rate with a corresponding reference value;
   performing, by the OLT, a power saving operation, upon determination that the data rate of the second data rate service is smaller than the predetermined data rate
   detecting, by the OLT, an actual communication distance between the OLT and the ONU;
   comparing, by the OLT, the actual communication distance between the OLT and the ONU, with a corresponding reference value; and
   performing, by the OLT, the power saving operation, upon determination that the actual communication distance is smaller than the corresponding reference value,
   wherein the corresponding reference value includes a predetermined communication distance.

6. The method of claim 5, wherein the power saving operation is performed upon determination that the actual communication distance is shorter than the predetermined communication distance.

7. The method of claim 6, wherein the power saving operation includes at least one of: adjusting a maximum reach supported by a passive optical network (PON) that includes the OLT and the ONU; switching off circuitry for nonlinear compensation for a communication between the OLT and the ONU; switching a modulation format associated with digital signal processing; switching off a forward error correction function for a communication between the OLT and the ONU; or adjusting a transmission optical power.

8. The method of claim 5, further comprising instructing, by the OLT, the ONU to enter a power saving mode, upon determination that the actual communication distance is shorter than the predetermined communication distance.

9. The method of claim 1, wherein the power saving operation includes at least one of a reception channel power saving operation of the OLT or a transmission channel power saving operation of the OLT.

10. An optical transceiver apparatus, comprising:
   an I/O interface communicatively coupled via an optical transmission medium to another optical transceiver apparatus;
   a memory to store executable instructions; and
   one or more processors configured to read the executable instructions from the memory to:
      detect, by an optical line terminal (OLT), a service change associated with an optical network unit (ONU) from a first data rate service to a second data rate service, the second data rate service having a lower data rate than the first data rate service;
      compare, by the OLT, a data rate of the second data rate service with a predetermined data rate with a corresponding reference value; and perform, by the OLT, a power saving operation, upon determination that the data rate of the second data rate service is smaller than the predetermined data rate, wherein the power saving operation includes at least one of:

switching off at least a portion of digital signal processing (DSP) functions;

switching off circuitry for nonlinear compensation;

switching off a forward error correction (FEC) function; or switching a modulation format for communication with the ONU.

11. The apparatus of claim 10, wherein the corresponding reference value is larger than a data rate of the second data rate service and smaller than a data rate of the first data rate service.

12. The apparatus of claim 10, wherein the one or more processors are further configured to instruct, by the OLT, the ONU to enter a power saving mode, upon detection of the service change from the first data rate service to the second data rate service.

13. The apparatus of claim 10, wherein the switching the modulation format includes switching a modulation format for transmission to the ONU to non-return to zero (NRZ) modulation format.

14. The apparatus of claim 10, wherein the power saving operation includes at least one of a reception channel power saving operation of the OLT or a transmission channel power saving operation of the OLT.

15. An optical transceiver apparatus, comprising:

an I/O interface communicatively coupled via an optical transmission medium to another optical transceiver apparatus;

a memory to store executable instructions; and one or more processors configured to read the executable instructions from the memory to:

detect, by an optical line terminal (OLT), a service change associated with an optical network unit (ONU) from a first data rate service to a second data rate service, the second data rate service having a lower data rate than the first data rate service;

compare, by the OLT, a data rate of the second data rate service with a predetermined data rate with a corresponding reference value;

perform, by the OLT, a power saving operation, upon determination that the data rate of the second data rate service is smaller than the predetermined data rate;

detect an actual communication distance between the OLT and the ONU;

compare the actual communication distance between the OLT and the ONU, with a corresponding reference value; and perform the power saving operation, upon determination that the actual communication distance is smaller than the corresponding reference value, wherein the corresponding reference value includes a predetermined communication distance.

16. The apparatus of claim 15, wherein the power saving operation is performed upon determination that the actual communication distance is shorter than the predetermined communication distance.

17. The apparatus of claim 16, wherein the power saving operation includes at least one of: adjusting a maximum reach supported by a passive optical network (PON) that includes the OLT and the ONU; switching off circuitry for nonlinear compensation for a communication between the OLT and the ONU; switching a modulation format associated with digital signal processing; switching off a forward error correction function for a communication between the OLT and the ONU; or adjusting a transmission optical power.

18. The apparatus of claim 15, the one or more processors are further configured to instruct, by the OLT, the ONU to enter a power saving mode, upon determination that the actual communication distance is shorter than the predetermined communication distance.

* * * * *